United States Patent
Furuhata

(10) Patent No.: US 12,175,759 B2
(45) Date of Patent: Dec. 24, 2024

(54) DISPLAY CONTROL DEVICE, DISPLAY SYSTEM, AND DISPLAY CONTROL METHOD

(71) Applicant: Mitsubishi Electric Corporation, Tokyo (JP)

(72) Inventor: Naoki Furuhata, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 345 days.

(21) Appl. No.: 17/700,495

(22) Filed: Mar. 22, 2022

(65) Prior Publication Data

US 2022/0215666 A1 Jul. 7, 2022

Related U.S. Application Data

(63) Continuation of application No. PCT/JP2019/046470, filed on Nov. 28, 2019.

(51) Int. Cl.
*G06K 9/00* (2022.01)
*G01C 21/20* (2006.01)
(Continued)

(52) U.S. Cl.
CPC .......... *G06V 20/52* (2022.01); *G01C 21/206* (2013.01); *G06T 7/20* (2013.01); *G06T 7/70* (2017.01);
(Continued)

(58) Field of Classification Search
None
See application file for complete search history.

(56) References Cited

U.S. PATENT DOCUMENTS

| 8,958,910 B2 * | 2/2015 | Ichinose ............... B66B 1/2458 |
| | | 700/258 |
| 9,333,652 B2 * | 5/2016 | Hu ............................ G06V 20/52 |

(Continued)

FOREIGN PATENT DOCUMENTS

| JP | 11-23305 A | 1/1999 |
| JP | 2001-184599 A | 7/2001 |

(Continued)

OTHER PUBLICATIONS

International Search Report and Written Opinion mailed on Mar. 3, 2020, received for PCT Application PCT/JP2019/046470, Filed on Nov. 28, 2019, 11 pages including English Translation.
(Continued)

*Primary Examiner* — Feng Niu
(74) *Attorney, Agent, or Firm* — XSENSUS LLP

(57) ABSTRACT

This display control device includes: a first mobile object information acquiring unit that acquires first mobile object information indicating the position, moving speed, and direction of movement of a first mobile object moving in a facility; a second mobile object information acquiring unit that acquires second mobile object information indicating the position, moving speed, and direction of movement of a second mobile object moving in the facility; an image acquisition unit that acquires, on the basis of the first mobile object information acquired by the first mobile object information acquiring unit and the second mobile object information acquired by the second mobile object information acquiring unit, image information indicating a display image to be displayed in a space in the facility by a display output device installed in the facility; and an image output unit that outputs the image information acquired by the image acquisition unit.

9 Claims, 12 Drawing Sheets

(51) Int. Cl.
  *G06T 7/20* (2017.01)
  *G06T 7/70* (2017.01)
  *G06V 20/52* (2022.01)
  *G08G 1/16* (2006.01)
  *G05D 1/224* (2024.01)
  *G06F 3/14* (2006.01)

(52) U.S. Cl.
  CPC ............ *G08G 1/164* (2013.01); *G08G 1/166* (2013.01); *G05D 1/2247* (2024.01); *G06F 3/14* (2013.01); *G06T 2207/30232* (2013.01); *G06T 2207/30248* (2013.01); *G09G 2380/10* (2013.01)

(56) References Cited

U.S. PATENT DOCUMENTS

| | | | |
|---|---|---|---|
| 9,465,984 B2 * | 10/2016 | Watanabe | G06F 3/044 |
| 9,983,592 B2 * | 5/2018 | Hong | G05D 1/0016 |
| 10,780,897 B2 * | 9/2020 | Kim | G08G 1/166 |
| 10,948,913 B2 * | 3/2021 | Lee | G08G 1/161 |
| 11,082,667 B2 * | 8/2021 | Deyle | G01C 21/3453 |
| 11,244,568 B2 * | 2/2022 | Borsos | B60W 60/007 |
| 11,472,035 B2 * | 10/2022 | Kalbavi | G06F 3/011 |
| 11,644,325 B2 * | 5/2023 | Uematsu | G06Q 50/40 701/414 |
| 11,897,727 B2 * | 2/2024 | Koba | B66B 1/3492 |
| 2004/0051644 A1 | 3/2004 | Tamayama et al. | |
| 2011/0205497 A1 | 8/2011 | Wakabayashi et al. | |
| 2012/0041593 A1 * | 2/2012 | Ichinose | B66B 1/2458 700/258 |
| 2014/0176599 A1 | 6/2014 | Watanabe et al. | |
| 2014/0316636 A1 * | 10/2014 | Hong | G05D 1/0016 901/1 |
| 2015/0131896 A1 * | 5/2015 | Hu | G06V 40/28 382/153 |
| 2018/0239355 A1 * | 8/2018 | Lee | G08G 1/166 |
| 2019/0218060 A1 | 7/2019 | Koba et al. | |
| 2019/0389069 A1 * | 12/2019 | Kalbavi | G06F 3/0346 |
| 2020/0053325 A1 * | 2/2020 | Deyle | G05D 1/0088 |
| 2020/0088524 A1 * | 3/2020 | Shin | G06V 20/58 |
| 2020/0247434 A1 * | 8/2020 | Kim | G08G 1/166 |
| 2020/0286384 A1 * | 9/2020 | Borsos | G08G 1/164 |
| 2020/0348516 A1 | 11/2020 | Sakata et al. | |
| 2021/0080274 A1 | 3/2021 | Uematsu et al. | |
| 2021/0240189 A1 * | 8/2021 | Sakurai | G05D 1/65 |
| 2022/0262236 A1 * | 8/2022 | Ueno | G06V 20/20 |
| 2022/0406064 A1 * | 12/2022 | Moriyama | G06V 20/44 |

FOREIGN PATENT DOCUMENTS

| | | |
|---|---|---|
| JP | 2011-170658 A | 9/2011 |
| JP | 2015-201113 A | 11/2015 |
| JP | 2017-7502 A | 1/2017 |
| JP | 2017-10385 A | 1/2017 |
| JP | 2019-87268 A | 6/2019 |
| JP | 2019-144168 A | 8/2019 |
| WO | 2018/066054 A1 | 4/2018 |
| WO | 2019/155623 A1 | 8/2019 |

OTHER PUBLICATIONS

Notice of Reasons for Refusal mailed on Aug. 18, 2020, received for JP Application 2020-522395, 8 pages including English Translation.
Office Action issued on Mar. 22, 2023, in corresponding German patent Application No. 112019007831.3, 18 pages.

* cited by examiner

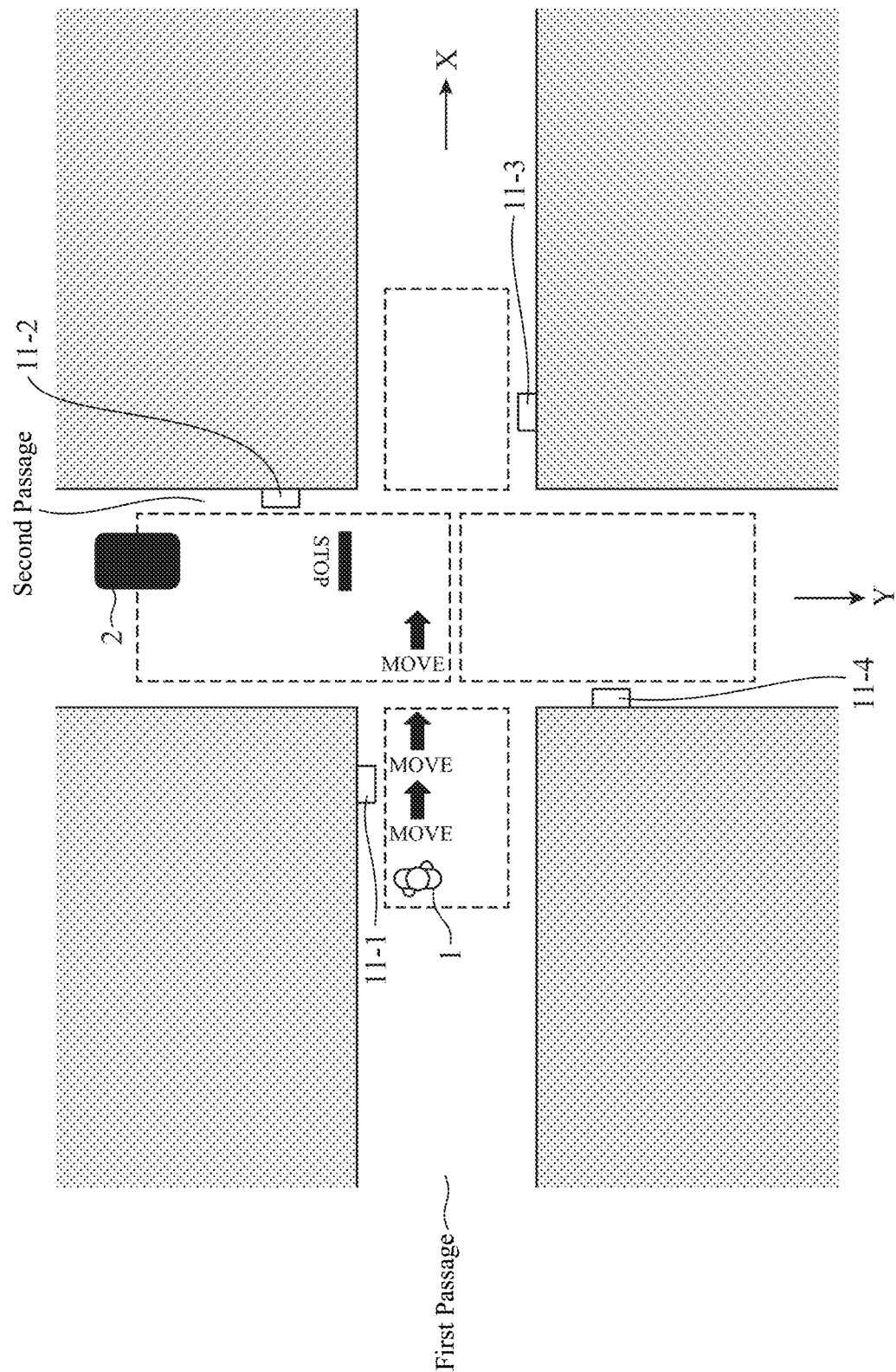

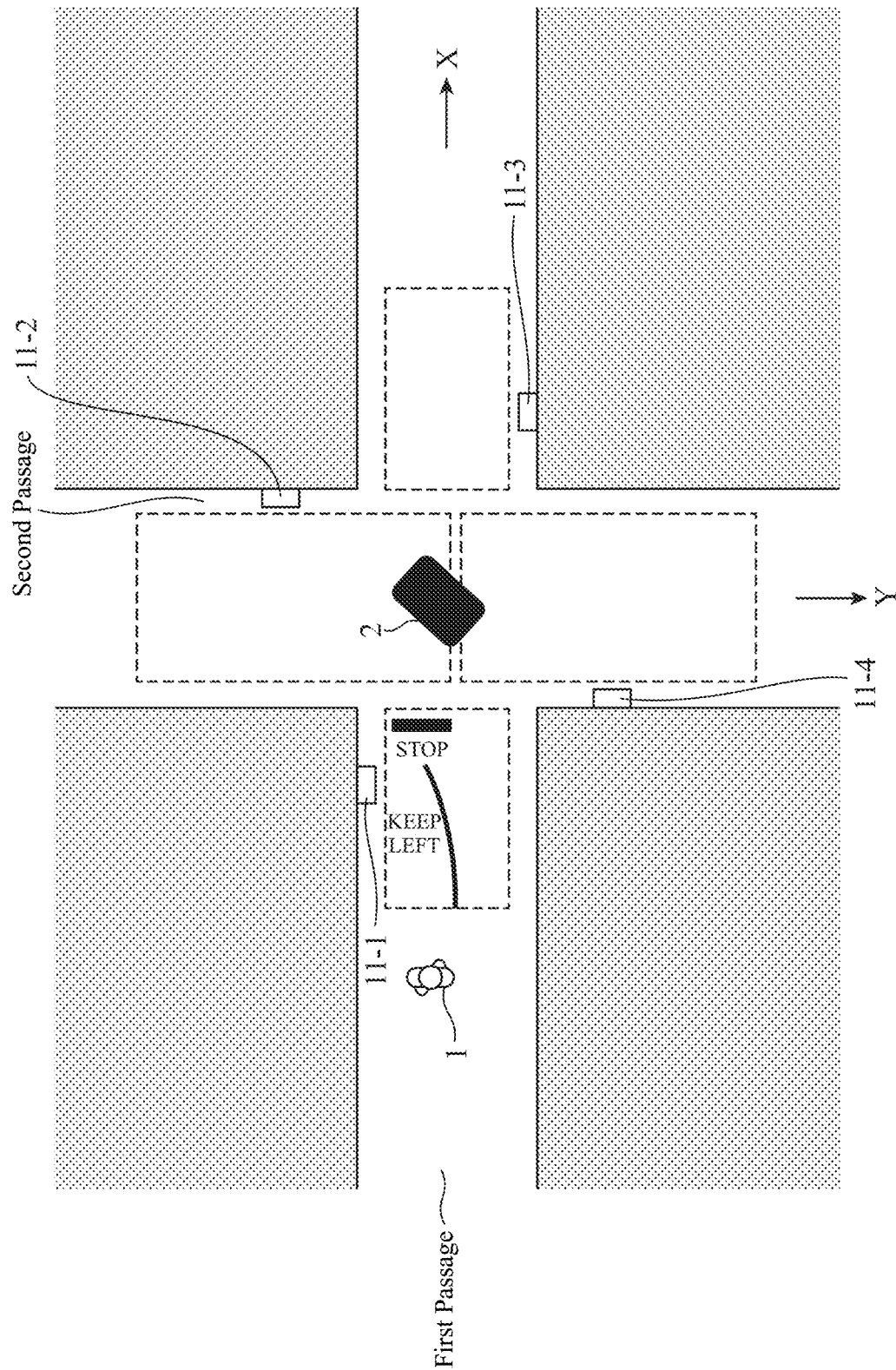

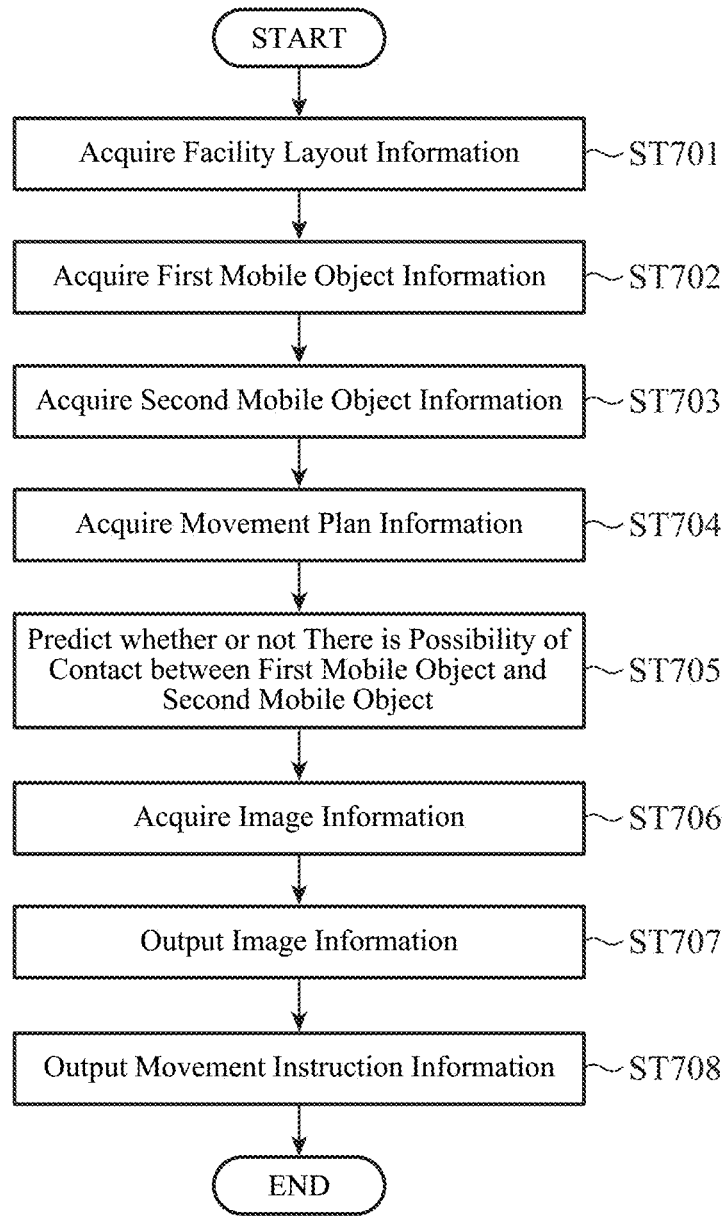

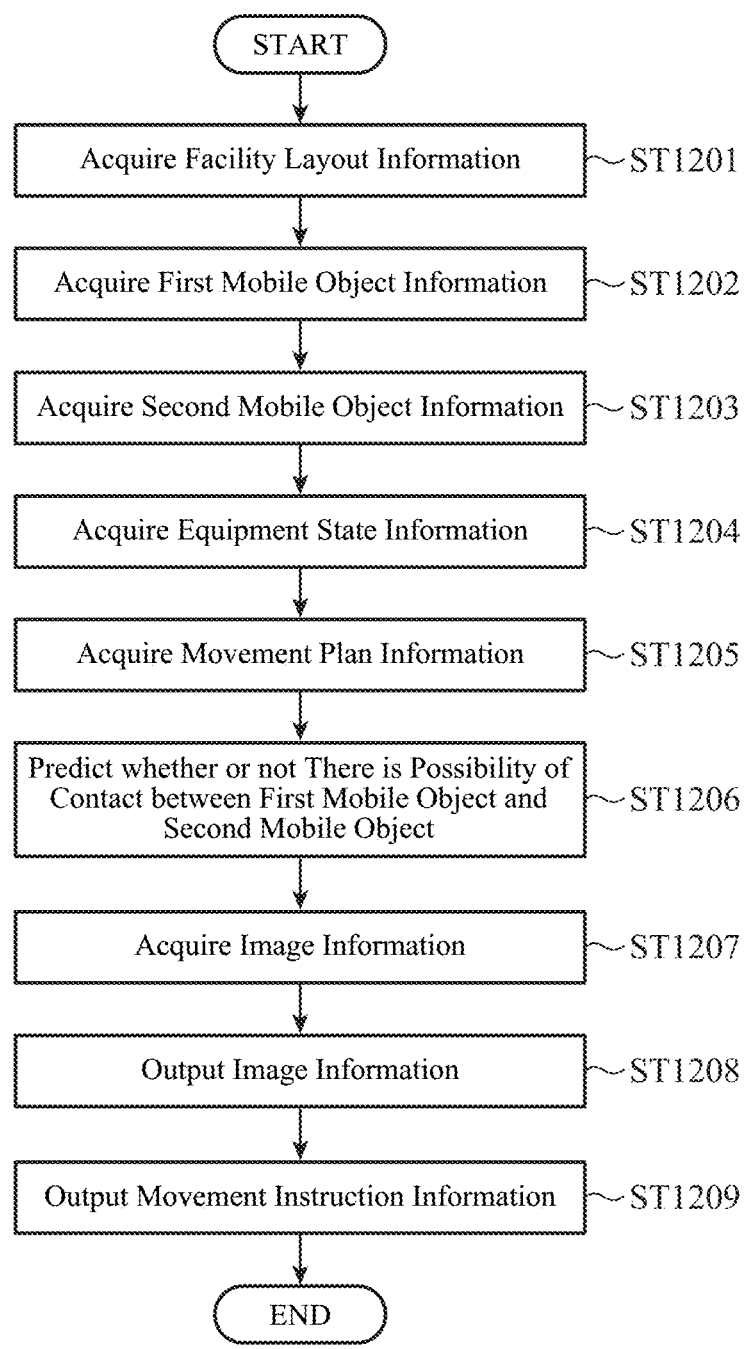

DISPLAY CONTROL DEVICE, DISPLAY SYSTEM, AND DISPLAY CONTROL METHOD

CROSS-REFERENCE TO RELATED APPLICATION

The present application is a continuation of International Patent Application PCT/JP2019/046470, filed Nov. 28, 2019, the entire contents of which are incorporated herein by reference.

TECHNICAL FIELD

The present invention relates to a display control device and a display control method.

BACKGROUND ART

In facilities including buildings such as office buildings, structures such as factories or warehouses, or public facilities such as stations, autonomous mobile devices such as self-propelled robots that move in the facilities are becoming widespread.

In a facility, contact between a person moving in the facility and a mobile object moving in the facility such as an autonomous mobile device moving in the facility or another person moving in the facility may occur.

Conventionally, there is a technique for avoiding contact between a vehicle traveling on a road and a person walking on the road (see, for example, Patent Literature 1).

CITATION LIST

Patent Literature

Patent Literature 1: JP 2015-201113 A

SUMMARY OF INVENTION

Technical Problem

The conventional technique disclosed in Patent Literature 1 is a technique for avoiding contact between a vehicle traveling on a road and a person walking on the road, and thus the technique does not consider contact between a person moving in a facility and a mobile object moving in the facility.

An object of the present invention is to provide a display control device capable of providing information for avoiding contact between a person moving in a facility and a mobile object moving in the facility to the person moving in the facility.

Solution to Problem

A display control device according to the present invention includes: processing circuitry to acquire first mobile object information indicating a position, a moving speed, and a direction of movement of a first mobile object moving in a facility; to acquire second mobile object information indicating a position, a moving speed, and a direction of movement of a second mobile object moving in the facility; to acquire, on the basis of the first mobile object information acquired and the second mobile object information acquired, image information indicating a display image to be displayed in a space in the facility by a display output device installed in the facility, the space being visible to the first mobile object or the second mobile object; and to output the image information acquired.

Advantageous Effects of Invention

According to the present invention, information for avoiding contact between a person moving in a facility and a mobile object moving in the facility can be provided to the person moving in the facility.

BRIEF DESCRIPTION OF DRAWINGS

FIG. 4A is a diagram illustrating an example of image information acquired by an image output unit included in the display control device according to the first embodiment.

FIG. 4B is a diagram illustrating another example of image information acquired by the image output unit included in the display control device according to the first embodiment.

FIG. 7 is a flowchart illustrating an example of processing performed by the display control device according to the first embodiment.

FIG. 12 is a flowchart illustrating an example of processing performed by the display control device according to the second embodiment.

DESCRIPTION OF EMBODIMENTS

Embodiments of the present invention will now be described in detail with reference to the drawings.

First Embodiment

A display control device 100 according to a first embodiment will be described with reference to FIGS. 1 to 7.

The configuration of a main part of a display system 10 according to the first embodiment to which the display control device 100 according to the first embodiment is applied will be described with reference to FIGS. 1 and 2.

Figure 1:
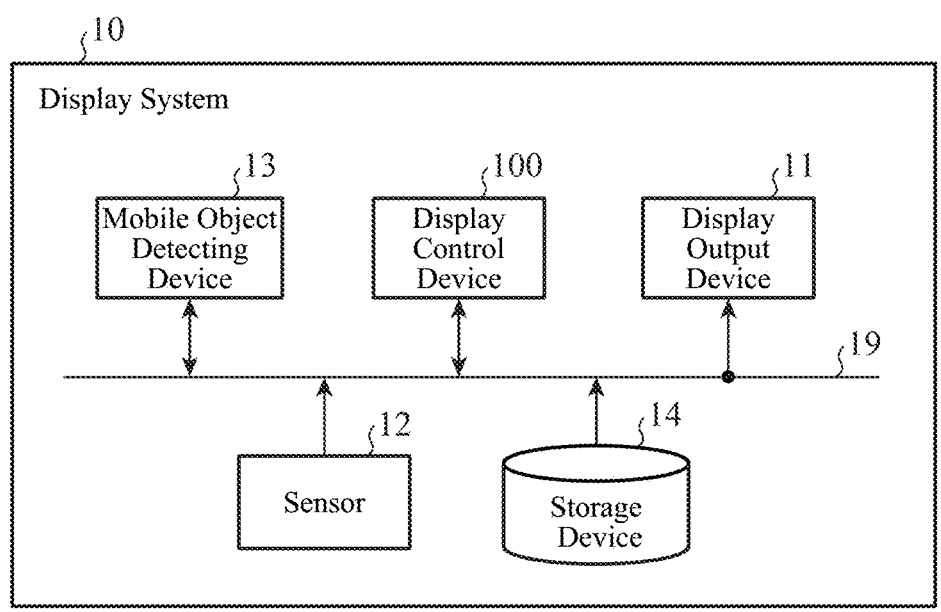
FIG. 1 is a block diagram illustrating an example of a configuration of a main part of a display system according to a first embodiment to which a display control device according to the first embodiment is applied.

FIG. 1 is a block diagram illustrating an example of the configuration of the main part of the display system 10 according to the first embodiment to which the display control device 100 according to the first embodiment is applied.

The display system 10 includes a display output device 11, a sensor 12, a mobile object detecting device 13, a storage device 14, and the display control device 100.

The display output device 11, the sensor 12, the mobile object detecting device 13, the storage device 14, and the display control device 100 included in the display system 10 are connected to each other via a network 19 capable of transmitting and receiving information.

The display output device 11 is a display device that is installed in a facility and displays, in a space in the facility, a display image. The space in the facility here includes a region on a structure constituting the facility, a space formed by a structure constituting the facility, and the like.

The display output device 11 is a projection type display device such as a front projector. The display output device 11 is installed in the facility, projects a display image toward a predetermined region on the structure constituting the facility, and thereby displays the display image on the structure.

The display image displayed by the display output device 11 is not limited to a still image, and may be a moving image.

The structure which constitutes the facility and on which the display output device 11 displays the display image is a floor in the facility, a wall in the facility, a door in the facility, a landing door or a landing operation panel of an elevator installed in the facility, or the like.

The display output device 11 is not limited to a projection type display device as long as it is a display device that is installed in the facility and displays, in a space in the facility, a display image. For example, the display output device 11 may be a display such as a light emitting diode (LED) display or an organic electro-luminescence (EL) display disposed on the structure constituting the facility, or may be an aerial display. The aerial display is a device that forms an image in the air.

The first embodiment describes an example in which the display output device 11 installed on the ceiling or wall of the facility projects a display image toward a floor in the facility to display the display image on the floor.

Figure 2:
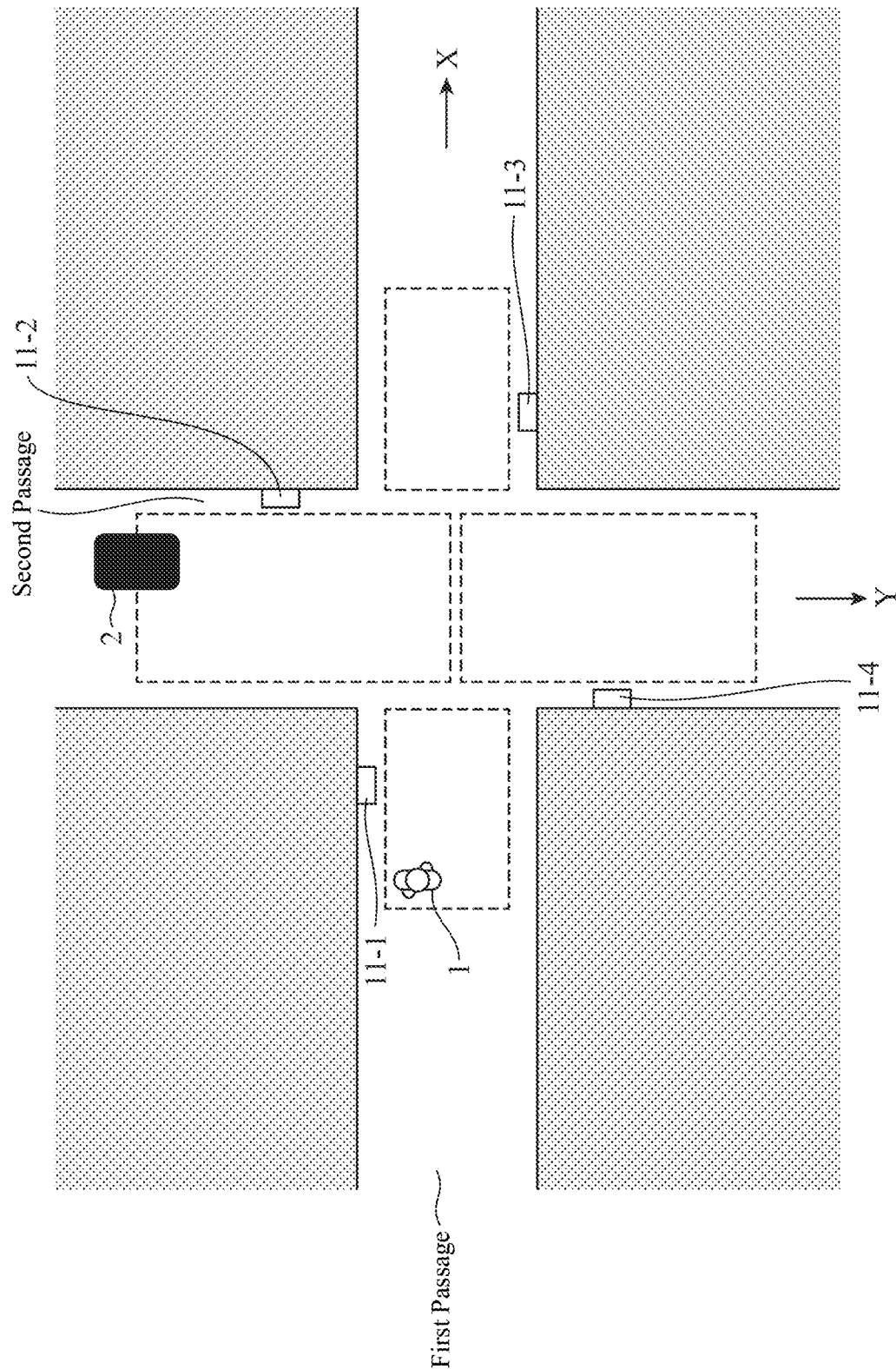
FIG. 2 is a layout diagram illustrating an example of a layout of a display output device, included in the display system according to the first embodiment, in a facility.

FIG. 2 is a layout diagram illustrating an example of the layout of the display output device 11, included in the display system 10 according to the first embodiment, in the facility. Specifically, FIG. 2 is a diagram of a part of a floor in the facility as viewed from above.

FIG. 2 illustrates four display output devices 11-1, 11-2, 11-3, and 11-4 as the display output device 11. Note that the display output device 11 is not limited to the four display output devices 11-1, 11-2, 11-3, and 11-4, and the number of the display output devices 11 may be three or less or five or more as long as it is one or more.

Rectangles indicated by a broken line in FIG. 2 are display regions where display images corresponding to the respective four display output devices 11-1, 11-2, 11-3, and 11-4 are displayed.

Further, FIG. 2 illustrates a first mobile object 1 and a second mobile object 2 which are mobile objects moving in the facility.

Although the number of mobile objects moving in the facility illustrated in FIG. 2 is two, the number of mobile objects moving in the facility may be three or more as long as it is two or more.

In addition, a plurality of mobile objects moving in the facility may be regarded as a single mobile object moving in the facility.

Each of the first mobile object 1 and the second mobile object 2 is a mobile object such as a person moving in the facility or an autonomous mobile device such as a self-propelled robot moving in the facility.

FIG. 2 illustrates, as an example, a state in which the first mobile object 1 moving on a first passage and the second mobile object 2 moving on a second passage orthogonal to the first passage move toward an intersection of the first passage and the second passage.

The movement of a person moving in the facility includes movement by walking, movement by running, movement using a wheelchair, and the like.

The movement of an autonomous mobile device moving in the facility includes, for example, traveling movement by rotation of wheels, walking movement by operating legs, and the like.

Note that a person moving in the facility may include an autonomous mobile device that identifies the display content of the display image displayed by the display output device 11 by a known image recognition technology or the like and can move in response to the identified display content. When a person moving in the facility is the autonomous mobile device described above, the movement of the person moving in the facility who is the autonomous mobile device includes, for example, traveling movement by rotation of wheels, walking movement by operating legs, and the like.

The sensor 12 is an imaging device such as a digital still camera, a digital video camera, or a surveillance camera. The sensor 12 is installed, for example, at a position where the first mobile object 1 and the second mobile object 2 illustrated in FIG. 2 can be imaged. Specifically, the sensor 12 is disposed, for example, on the ceiling at the intersection of the first passage and the second passage illustrated in FIG. 2. The sensor 12 transmits sensor information indicating the captured image to the mobile object detecting device 13 via the network 19.

Note that, although the number of sensors 12 is one in the first embodiment, the number of sensors 12 may be two or more.

The mobile object detecting device 13 detects the position of the first mobile object 1 moving on the first passage by a known image analysis technology on the basis of the sensor information transmitted by the sensor 12. In addition, the mobile object detecting device 13 detects the moving speed and the direction of movement of the first mobile object 1 by a known image analysis technology on the basis of a plurality of positions of the first mobile object 1 detected at different times by the mobile object detecting device 13. Further, the mobile object detecting device 13 generates first mobile object information indicating the position, moving speed, and direction of movement of the first mobile object 1 which have been detected, and outputs the generated first mobile object information to the display control device 100.

Similarly, the mobile object detecting device 13 detects the position of the second mobile object 2 moving on the second passage by a known image analysis technology on the basis of the sensor information transmitted by the sensor 12. In addition, the mobile object detecting device 13 detects the moving speed and the direction of movement of the second mobile object 2 by a known image analysis technology on the basis of a plurality of positions of the second mobile object 2 detected at different times by the mobile object detecting device 13. Further, the mobile object detecting device 13 generates second mobile object information indicating the position, moving speed, and direction of movement of the second mobile object 2 which have been detected, and outputs the generated second mobile object information to the display control device 100.

The mobile object detecting device 13 may detect the type of each of the first mobile object 1 and the second mobile object 2 in addition to detecting the position, the moving speed, and the direction of movement of each of the first mobile object 1 and the second mobile object 2.

The type of each of the first mobile object 1 and the second mobile object 2 is, for example, a person, an autonomous mobile device such as a self-propelled robot, or the like.

Note that the person that is one of the types of the first mobile object 1 and the second mobile object 2 may include not only a so-called human, but also, for example, a self-propelled robot or the like that identifies display content of the display image displayed by the display output device 11 by a known image recognition technology or the like and can move in response to the identified display content.

The mobile object detecting device 13 may detect only one type that is either a person or an autonomous mobile device out of the types of the first mobile object 1 and the second mobile object 2, and when unable to detect the type, the mobile object detecting device 13 may determine that the type is the other type out of the person and the autonomous mobile device.

Specifically, the mobile object detecting device 13 detects the types of the first mobile object 1 and the second mobile object 2 by image analysis technology on the basis of the sensor information transmitted by the sensor 12, for example. For example, the mobile object detecting device 13 adds information indicating the detected type of the first mobile object 1 to the first mobile object information and outputs the resultant first mobile object information to the display control device 100. Further, the mobile object detecting device 13 adds information indicating the detected type of the second mobile object 2 to the second mobile object information and outputs the resultant second mobile object information to the display control device 100.

Note that a method for detecting the positions, the moving speeds, and the directions of movement of the first mobile object 1 and the second mobile object 2 on the basis of the sensor information by the image analysis technology is known, and thus the description thereof will be omitted.

In addition, a method for detecting the types of the first mobile object 1 and the second mobile object 2 on the basis of the sensor information by the image analysis technology is known, and thus the description thereof will be omitted.

The mobile object detecting device 13 is disposed, for example, in a predetermined place such as a server room in the facility. The place where the mobile object detecting device 13 is disposed is not limited to the interior of the facility, and the mobile object detecting device 13 may be disposed outside the facility as long as information can be transmitted to and received from the sensor 12 and the display control device 100 via the network 19.

The sensor 12 is not limited to the imaging device as long as the mobile object detecting device 13 can detect the positions of the first mobile object 1 and the second mobile object 2 on the basis of the sensor information transmitted from the sensor 12. The sensor 12 may be an infrared sensor, an ultrasonic sensor, a radar sensor, a laser ranging sensor, or the like.

Note that a method for detecting the positions of the first mobile object 1 and the second mobile object 2 on the basis of sensor information output from an infrared sensor, an ultrasonic sensor, a radar sensor, a laser ranging sensor, or the like is known, and thus the description thereof will be omitted.

In addition, in a case where the first mobile object 1 and the second mobile object 2 each carry a device or the like, such as a radio frequency identifier (RFID) tag or a beacon conforming to Bluetooth Low Energy (BLE (registered trademark)), that generates a radio wave or the like enabling identification of a position, the sensor 12 may receive, for example, a radio wave emitted by the RFID tag or the beacon conforming to BLE or the like, and output information indicating the received radio wave as sensor information.

Note that a method for detecting the positions of the first mobile object 1 and the second mobile object 2 on the basis of, for example, information indicating a radio wave emitted by the RFID tag or information indicating a radio wave emitted by the beacon conforming to BLE or the like is known, and thus the description thereof will be omitted.

The display control device 100 acquires the first mobile object information and the second mobile object information output from the mobile object detecting device 13, and outputs image information indicating a display image corresponding to the first mobile object information and the second mobile object information.

The display control device 100 is disposed, for example, in a predetermined place such as a server room in the facility. The place where the display control device 100 is disposed is not limited to the interior of the facility, and the display control device 100 may be disposed outside the facility as long as information can be acquired from the mobile object detecting device 13 and the storage device 14 via the network 19.

Details of the display control device 100 will be described later.

The storage device 14 includes, for example, a storage medium such as a solid state drive (SSD) or a hard disk drive (HDD). The storage device 14 reads, in response to a request from the display control device 100, information corresponding to the request from the storage medium and outputs the read information to the display control device 100.

The storage device 14 is disposed, for example, in a predetermined place such as a server room in the facility. The place where the storage device 14 is disposed is not limited to the interior of the facility, and the storage device 14 may be disposed outside the facility as long as the display control device 100 can acquire information from the storage device 14 via the network 19.

The configuration of the main part of the display control device 100 according to the first embodiment will be described with reference to FIG. 3.

Figure 3:
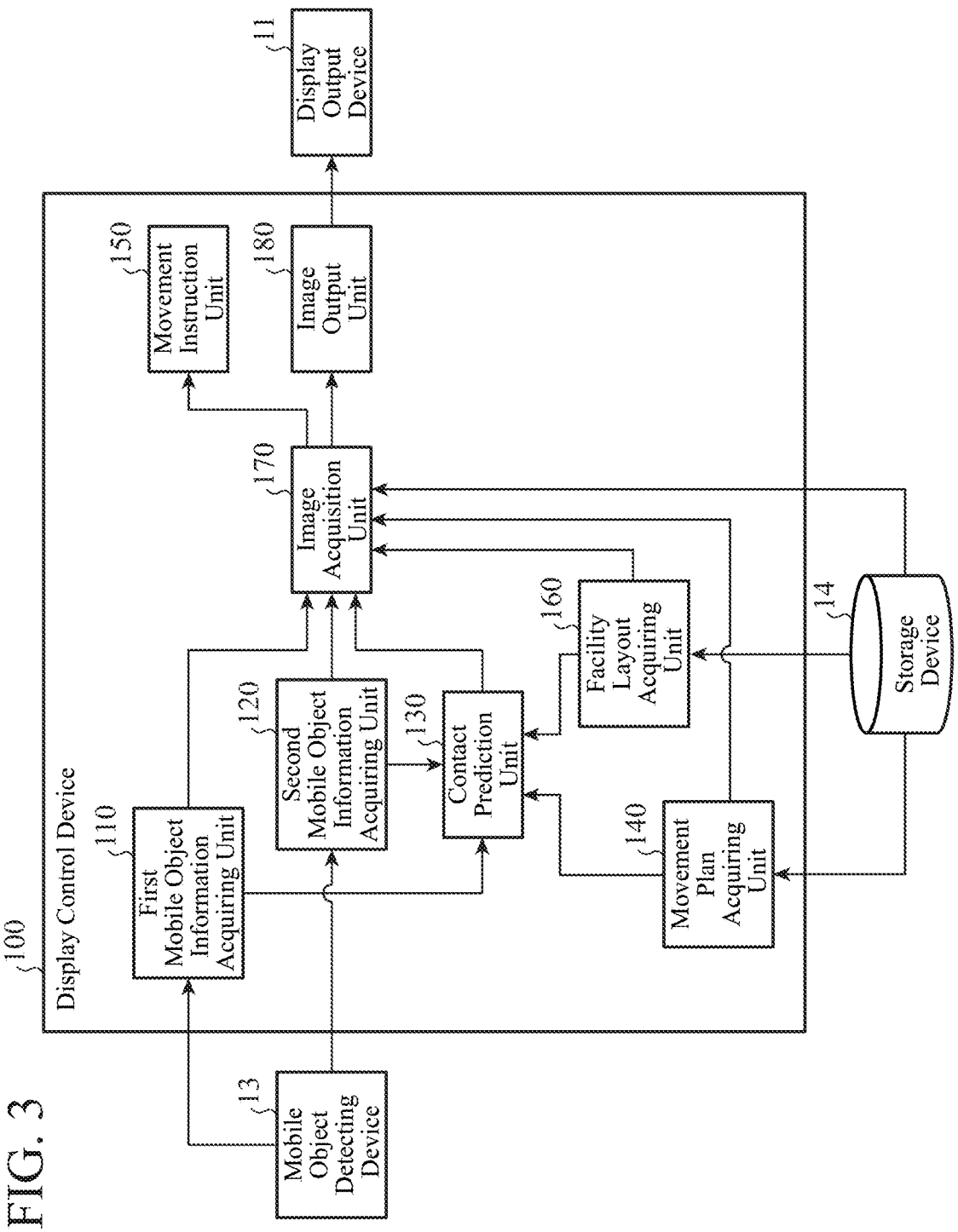
FIG. 3 is a block diagram illustrating an example of a configuration of a main part of the display control device according to the first embodiment.

FIG. 3 is a block diagram illustrating an example of the configuration of the main part of the display control device 100 according to the first embodiment.

The display control device 100 includes a first mobile object information acquiring unit 110, a second mobile object information acquiring unit 120, a contact prediction unit 130, a movement plan acquiring unit 140, a movement instruction unit 150, a facility layout acquiring unit 160, an image acquisition unit 170, and an image output unit 180.

The first mobile object information acquiring unit 110 acquires the first mobile object information indicating the position, moving speed, and direction of movement of the first mobile object 1 moving in the facility. Specifically, the first mobile object information acquiring unit 110 acquires the first mobile object information generated and output by the mobile object detecting device 13 via the network 19, for example.

The second mobile object information acquiring unit 120 acquires the second mobile object information indicating the position, moving speed, and direction of movement of the second mobile object 2 moving in the facility. Specifically, the second mobile object information acquiring unit 120 acquires the second mobile object information generated and output by the mobile object detecting device 13 via the network 19, for example.

In the first embodiment, the mobile object detecting device 13 operates as a device different from the display control device 100, but no limitation thereto is intended. For example, the display control device 100 may include the mobile object detecting device 13 therein, and the display control device 100 may acquire the first mobile object information and the second mobile object information output by the mobile object detecting device 13 included in the display control device 100.

Furthermore, in a case where the first mobile object 1 is an autonomous mobile device such as a self-propelled robot, the first mobile object information acquiring unit 110 may acquire, from the first mobile object 1 without using the mobile object detecting device 13, first mobile object information indicating the position, the moving speed, and the direction of movement of the first mobile object 1, which is the autonomous mobile device, output from, for example, a navigation system (not illustrated) included in the first mobile object 1.

Similarly, in a case where the second mobile object 2 is an autonomous mobile device such as a self-propelled robot, the second mobile object information acquiring unit 120 may acquire, from the second mobile object 2 without using the mobile object detecting device 13, second mobile object information indicating the position, the moving speed, and the direction of movement of the second mobile object 2, which is the autonomous mobile device, output from, for example, a navigation system included in the second mobile object 2.

For example, the first mobile object 1 which is the autonomous mobile device includes a wireless communication unit (not illustrated), and the first mobile object 1 which is the autonomous mobile device outputs the first mobile object information via the wireless communication unit. The first mobile object information output from the first mobile object 1 is acquired by the first mobile object information acquiring unit 110 via the network 19 and a wireless access point (not illustrated) connected to the network 19.

Similarly, the second mobile object 2 which is the autonomous mobile device includes a wireless communication unit, and the second mobile object 2 which is the autonomous mobile device outputs the second mobile object information via the wireless communication unit. The second mobile object information output from the second mobile object 2 is acquired by the second mobile object information acquiring unit 120 via the network 19 and a wireless access point connected to the network 19.

In addition, in a case where the first mobile object 1 is an autonomous mobile device and the first mobile object 1 that is the autonomous mobile device moves by acquiring control information output by a movement control device (not illustrated) that controls the movement of the autonomous mobile device via the network 19, the first mobile object information acquiring unit 110 may acquire first mobile object information indicating the position, moving speed, and direction of movement of the first mobile object 1 from, for example, the movement control device without using the mobile object detecting device 13.

Similarly, in a case where the second mobile object 2 is an autonomous mobile device and the second mobile object 2 that is the autonomous mobile device moves by acquiring control information output by the movement control device that controls the movement of the autonomous mobile device via the network 19, the second mobile object information acquiring unit 120 may acquire second mobile object information indicating the position, moving speed, and direction of movement of the second mobile object 2 from, for example, the movement control device without using the mobile object detecting device 13.

Note that, in a case where the first mobile object information acquiring unit 110 acquires the first mobile object information without using the mobile object detecting device 13 as described above, the first mobile object 1 or the movement control device may add information indicating that the type of the first mobile object 1 is an autonomous mobile device such as a self-propelled robot to the first mobile object information, and output the resultant first mobile object information.

Similarly, in a case where the second mobile object information acquiring unit 120 acquires the second mobile object information without using the mobile object detecting device 13 as described above, the second mobile object 2 or the movement control device may add information indicating that the type of the second mobile object 2 is an autonomous mobile device such as a self-propelled robot to the second mobile object information, and output the resultant second mobile object information.

The image acquisition unit 170 acquires, on the basis of the first mobile object information acquired by the first mobile object information acquiring unit 110 and the second mobile object information acquired by the second mobile object information acquiring unit 120, image information indicating a display image to be displayed in a space in the facility by the display output device 11 installed in the facility.

The image acquisition unit 170 acquires the image information, for example, by reading the image information from the storage device 14.

For example, in a case where according to the first mobile object information and the second mobile object information, the type of the first mobile object 1 or the second mobile object 2 is a person, the image acquisition unit 170 acquires at least image information indicating a display image which is to be displayed in a space visible to the first mobile object 1 or the second mobile object 2 whose type is a person.

With this configuration, the display control device 100 can provide information for avoiding contact between the first mobile object 1 moving in the facility and the second mobile object 2 moving in the facility to the first mobile object 1 or the second mobile object 2 that is a person moving in the facility.

Note that the display image indicated by the image information acquired by the image acquisition unit 170 is not limited to a still image, and may be a moving image.

Furthermore, the number of pieces of image information acquired by the image acquisition unit 170 is not limited to one. In a case where, for example, the display output device 11 includes a plurality of display output devices 11-1, 11-2, 11-3, and 11-4 as illustrated in FIG. 2, the image acquisition unit 170 may acquire pieces of image information corresponding to the respective plurality of display output devices 11-1, 11-2, 11-3, and 11-4 on the basis of the first mobile object information and the second mobile object information.

Details of the image acquisition unit 170 will be described later.

The image output unit 180 outputs the image information acquired by the image acquisition unit 170.

Specifically, the image output unit 180 outputs the image information acquired by the image acquisition unit 170 to, for example, the display output device 11 installed in the facility.

More specifically, the image output unit 180 outputs the image information acquired by the image acquisition unit 170 as, for example, an image signal for causing the display output device 11 to output the image information as a display image.

The display output device 11 receives the image information output from the image output unit 180 and displays, in a space in the facility, the display image indicated by the image information.

The facility layout acquiring unit 160 acquires facility layout information indicating a position where a structure constituting the facility, such as a passage, a wall, or equipment in the facility, is located. For example, the facility layout acquiring unit 160 acquires the facility layout information by reading the facility layout information from the storage device 14 via the network 19. The facility layout acquiring unit 160 outputs the acquired facility layout information to the image acquisition unit 170.

Note that the facility layout acquiring unit 160 is not an essential component for the display control device 100.

In a case where the display control device 100 includes the facility layout acquiring unit 160, the image acquisition unit 170 may acquire image information on the basis of the facility layout information acquired by the facility layout acquiring unit 160 in addition to the first mobile object information acquired by the first mobile object information acquiring unit 110 and the second mobile object information acquired by the second mobile object information acquiring unit 120.

In a case where the first mobile object 1 or the second mobile object 2 is an autonomous mobile device that moves in the facility, the movement plan acquiring unit 140 acquires movement plan information indicating a movement plan of the first mobile object 1 or the second mobile object 2 that is an autonomous mobile device. For example, the movement plan acquiring unit 140 acquires the movement plan information by reading the movement plan information from the storage device 14 via the network 19. The movement plan acquiring unit 140 may acquire movement plan information from an autonomous mobile device or the above-mentioned movement control device via the network 19. The movement plan acquiring unit 140 outputs the acquired movement plan information to the image acquisition unit 170.

The first mobile object 1 or the second mobile object 2 that is an autonomous mobile device moves in the facility on the basis of a predetermined movement plan indicated by the movement plan information.

Note that the movement plan acquiring unit 140 is not an essential component for the display control device 100.

In a case where the display control device 100 includes the movement plan acquiring unit 140, the image acquisition unit 170 may acquire image information on the basis of the movement plan information acquired by the movement plan acquiring unit 140 in addition to the first mobile object information acquired by the first mobile object information acquiring unit 110 and the second mobile object information acquired by the second mobile object information acquiring unit 120. The movement plan information acquired by the movement plan acquiring unit 140 is not limited to information indicating a movement plan of the first mobile object 1 or the second mobile object 2 which is an autonomous mobile device, and may be information indicating a movement prediction result acquired by predicting a direction of movement or the like of the first mobile object 1 or the second mobile object 2.

The contact prediction unit 130 predicts whether or not there is a possibility of contact between the first mobile object 1 and the second mobile object 2 on the basis of the first mobile object information acquired by the first mobile object information acquiring unit 110 and the second mobile object information acquired by the second mobile object information acquiring unit 120. The contact prediction unit 130 outputs a prediction result obtained by predicting whether or not there is a possibility of contact between the first mobile object 1 and the second mobile object 2 to the image acquisition unit 170.

Note that the contact prediction unit 130 is not an essential component for the display control device 100.

In a case where the display control device 100 includes the contact prediction unit 130, the image acquisition unit 170 may acquire image information on the basis of the prediction result predicted by the contact prediction unit 130 in addition to the first mobile object information acquired by the first mobile object information acquiring unit 110 and the second mobile object information acquired by the second mobile object information acquiring unit 120.

In addition, in a case where the display control device 100 includes the facility layout acquiring unit 160, the contact prediction unit 130 may predict whether or not there is a possibility of contact between the first mobile object 1 and the second mobile object 2 on the basis of the facility layout information acquired by the facility layout acquiring unit 160 in addition to the first mobile object information acquired by the first mobile object information acquiring unit 110 and the second mobile object information acquired by the second mobile object information acquiring unit 120.

Furthermore, in a case where the first mobile object 1 or the second mobile object 2 is an autonomous mobile device that moves in the facility, and the display control device 100 includes the movement plan acquiring unit 140, the contact prediction unit 130 may predict whether or not there is a possibility of contact between the first mobile object 1 and the second mobile object 2 on the basis of the movement plan information acquired by the movement plan acquiring unit 140 in addition to the first mobile object information acquired by the first mobile object information acquiring unit 110 and the second mobile object information acquired by the second mobile object information acquiring unit 120.

In a case where the first mobile object 1 or the second mobile object 2 is an autonomous mobile device that moves in the facility, the movement instruction unit 150 outputs movement instruction information indicating a movement instruction such as temporary stop or resuming the movement to the first mobile object 1 or the second mobile object 2 which is an autonomous mobile device.

Specifically, the movement instruction unit 150 outputs movement instruction information corresponding to the display image indicated by the image information acquired by the image acquisition unit 170.

For example, the movement instruction unit 150 outputs the movement instruction information to the autonomous mobile device or the above-mentioned movement control device via the network 19.

Note that the movement instruction unit 150 is not an essential component for the display control device 100.

The image information acquired by the image acquisition unit 170 according to the first embodiment on the basis of the first mobile object information and the second mobile object information will be described with reference to FIGS. 4A, 4B, and 5.

In the following, as an example, the first mobile object 1 is a person moving in the facility, and the second mobile object 2 is an autonomous mobile device such as a self-propelled robot that moves in the facility or a person moving in the facility.

FIGS. 4A and 4B are diagrams each illustrating an example of the image information acquired by the image acquisition unit 170 according to the first embodiment on the basis of the first mobile object information and the second mobile object information.

More specifically, each of FIGS. 4A and 4B is a diagram of a part of a floor in the facility as viewed from above and illustrates a state in which the display image indicated by the image information acquired by the image acquisition unit 170 is displayed by the display output device 11.

FIGS. 4A and 4B illustrate the first passage and the second passage orthogonal to the first passage, as in the layout diagram illustrated in FIG. 2. In addition, FIGS. 4A and 4B illustrate four display output devices 11-1, 11-2, 11-3, and 11-4 as the display output device 11. Further, FIGS. 4A and 4B illustrate the first mobile object 1 moving on the first passage and the second mobile object 2 moving on the second passage.

The first mobile object 1 illustrated in FIGS. 4A and 4B moves on the first passage in a direction of an arrow X illustrated in FIGS. 4A and 4B.

The second mobile object 2 illustrated in FIGS. 4A and 4B moves on the second passage in a direction of an arrow Y illustrated in FIGS. 4A and 4B.

For example, the image acquisition unit 170 determines whether the first mobile object 1 or the second mobile object 2 enters the intersection of the first passage and the second passage first on the basis of the first mobile object information and the second mobile object information, and acquires image information indicating a display image that prompts the mobile object that enters the intersection first to move and prompts the mobile object that enters the intersection later to stop.

For example, the image acquisition unit 170 acquires, on the basis of the first mobile object information and the second mobile object information, image information indicating a display image that prompts the mobile object entering the intersection later to move after the mobile object that enters the intersection first passes the intersection.

FIG. 4A illustrates a state in which, in a case where the first mobile object 1 that is a person moving in the facility first enters the intersection, the image acquisition unit 170 acquires image information indicating, for example, a display image prompting the first mobile object 1 that is a person moving in the facility to move and suggesting, to the first mobile object 1 that is a person moving in the facility, that the second mobile object 2 will stop.

FIG. 4A also illustrates a state in which, in a case where the first mobile object 1 that is a person moving in the facility first enters the intersection, the image acquisition unit 170 acquires image information indicating, for example, a display image suggesting, to the second mobile object 2 that is a person moving in the facility, that the first mobile object 1 that is a person moving in the facility will move and prompting the second mobile object 2 that is a person moving in the facility to stop.

With this configuration, the display control device 100 can provide information for avoiding contact between the first mobile object 1 that is a person moving in the facility and the second mobile object 2 moving in the facility to the first mobile object 1 that is a person moving in the facility.

In addition, in a case where the second mobile object 2 is a person moving in the facility, the display control device 100 can provide, due to the above configuration, information for avoiding contact between the first mobile object 1 that is a person moving in the facility and the second mobile object 2 that is a person moving in the facility to the first mobile object 1 and the second mobile object 2 each of which is a person moving in the facility.

In addition, the image acquisition unit 170 may determine image information to be acquired on the basis of a priority passage rule that is a movement rule provided in advance in addition to the first mobile object information and the second mobile object information. The priority passage rule provides priorities between, for example, the movement of a mobile object moving through the first passage and the movement of a mobile object moving through the second passage. The image acquisition unit 170 may have the information indicating the priority passage rule in advance or may acquire the information from the storage device 14 via the network 19.

Specifically, for example, the image acquisition unit 170 acquires image information indicating a display image that prompts the mobile object moving on the passage having higher priority to move out of the first mobile object 1 moving on the first passage and the second mobile object 2 moving on the second passage and prompts the mobile object moving on another passage having lower priority to stop, on the basis of the first mobile object information, the second mobile object information, and the priority passage rule provided in advance. In a case where the mobile object moving on the first passage is moved in preference to the mobile object moving on the second passage, the image acquisition unit 170 acquires, for example, image information indicating the display image illustrated in FIG. 4A.

The image acquisition unit 170 acquires image information indicating, for example, a display image that prompts the mobile object moving on the passage having lower priority to move after the mobile object moving on the passage having higher priority passes the intersection of the first passage and the second passage, on the basis of the first mobile object information, the second mobile object information, and the priority passage rule provided in advance.

With this configuration, the display control device 100 can provide information for avoiding contact between the first mobile object 1 that is a person moving in the facility and the second mobile object 2 moving in the facility to the first mobile object 1 that is a person moving in the facility.

In addition, in a case where the second mobile object 2 is a person moving in the facility, the display control device 100 can provide, due to the above configuration, information for avoiding contact between the first mobile object 1 that is a person moving in the facility and the second mobile object 2 that is a person moving in the facility to the first mobile object 1 and the second mobile object 2 each of which is a person moving in the facility.

In addition, in a case where the second mobile object 2 is an autonomous mobile device that moves in the facility, the image acquisition unit 170 may determine image information to be acquired on the basis of a priority mobile object rule that is a movement rule provided in advance, in addition to the first mobile object information and the second mobile object information. The priority mobile object rule provides priorities between, for example, the movement of a person moving in the facility and the movement of an autonomous mobile device moving in the facility. The image acquisition unit 170 may have the information indicating the priority mobile object rule in advance or may acquire the information from the storage device 14 via the network 19.

Specifically, the image acquisition unit 170 acquires image information indicating, for example, a display image that prompts a mobile object having higher priority out of a person moving in the facility and an autonomous mobile device moving in the facility to move and prompts the other mobile object having lower priority to stop, on the basis of the first mobile object information, the second mobile object information, and the priority mobile object rule provided in advance. In a case where the person moving in the facility is moved in preference to the autonomous mobile device moving in the facility, the image acquisition unit 170 acquires image information indicating, for example, the display image illustrated in FIG. 4A.

The image acquisition unit 170 acquires image information indicating, for example, a display image that prompts the mobile object having lower priority to move after the mobile object having higher priority passes the intersection of the first passage and the second passage, on the basis of the first mobile object information, the second mobile object information, and the priority mobile object rule provided in advance.

With this configuration, the display control device 100 can provide information for avoiding contact between the first mobile object 1 that is a person moving in the facility and the second mobile object 2 moving in the facility to the first mobile object 1 that is a person moving in the facility, under a situation where there are a person moving in the facility and an autonomous mobile device moving in the facility.

The image acquisition unit 170 determines image information to be acquired on the basis of the first mobile object information and the second mobile object information, for example. Specifically, for example, the image acquisition unit 170 calculates a first distance that is a distance from the position of the intersection between the first passage and the second passage to the position of the first mobile object 1 indicated by the first mobile object information and a second distance that is a distance from the position of the intersection to the position of the second mobile object 2 indicated by the second mobile object information, and determines image information to be acquired on the basis of the first distance and the second distance. More specifically, the image acquisition unit 170 calculates the first distance and the second distance on the basis of, for example, the first mobile object information, the second mobile object information, and the facility layout information acquired by the facility layout acquiring unit 160. For example, the image acquisition unit 170 acquires image information indicating display images having different colors, sizes, shapes, animation modes in a moving image, or the like between a case where the first distance or the second distance is longer than a predetermined distance and a case where it is shorter than the predetermined distance.

Furthermore, the image acquisition unit 170 may determine the image information to be acquired on the basis of, for example, the moving speed of the first mobile object 1 indicated by the first mobile object information or the moving speed of the second mobile object 2 indicated by the second mobile object information. More specifically, for example, the image acquisition unit 170 acquires image information indicating display images having different colors, sizes, shapes, animation modes in a moving image, or the like between a case where the moving speed of the first mobile object 1 or the moving speed of the second mobile object 2 is lower than a predetermined moving speed and a case where it is higher than the predetermined moving speed.

Furthermore, in a case where the second mobile object 2 is an autonomous mobile device that moves in the facility, the image acquisition unit 170 may acquire the image information on the basis of movement plan information indicating a movement plan of the movement of the autonomous mobile device acquired by the movement plan acquiring unit 140, in addition to the first mobile object information and the second mobile object information.

FIG. 4B is a diagram illustrating a case where, in accordance with the movement plan indicated by the movement plan information, the second mobile object 2 that is the autonomous mobile device moving on the second passage turns right at the intersection between the first passage and the second passage toward the direction of the first mobile object 1 and moves on the first passage after turning right. In that case, the image acquisition unit 170 acquires image information indicating, for example, a display image prompting the first mobile object 1 that is a person moving in the facility to shift to an area where the second mobile object 2 does not go in the first passage in consideration of the size, the radius of rotation, the turning radius differential, or the like of the second mobile object 2 that is the autonomous mobile device, as illustrated in FIG. 4B.

For example, the image acquisition unit 170 acquires image information indicating a display image prompting the first mobile object 1 that is a person moving in the facility to move after the second mobile object 2 that is the autonomous mobile device passes the intersection between the first passage and the second passage on the basis of the first mobile object information and the second mobile object information.

With this configuration, the display control device 100 can provide information for avoiding contact between the first mobile object 1 that is a person moving in the facility and the second mobile object 2 moving in the facility to the first mobile object 1 that is a person moving in the facility, under a situation where there are a person moving in the facility and an autonomous mobile device moving in the facility.

The image acquisition unit 170 may acquire image information indicating a display image to be displayed in a space in the facility by the display output device 11 installed in the facility on the basis of a prediction result predicted by the contact prediction unit 130 and indicating whether or not there is a possibility of contact between the first mobile object 1 and the second mobile object 2, in addition to the first mobile object information and the second mobile object information.

Specifically, when, for example, the prediction result predicted by the contact prediction unit 130 indicates that there is a possibility of contact between the first mobile object 1 and the second mobile object 2, the image acquisition unit 170 acquires, on the basis of the first mobile object information and the second mobile object information, image information indicating a display image to be displayed in a space in the facility as information for avoiding contact between the first mobile object 1 that is a person moving in the facility and the second mobile object 2 moving in the facility. In addition, when the prediction result predicted by the contact prediction unit 130 indicates that there is no possibility of contact between the first mobile object 1 and the second mobile object 2, the image acquisition unit 170 does not need to acquire image information indicating a display image to be displayed in a space in the facility as information for avoiding contact between the first mobile object 1 and the second mobile object 2, because there is no possibility of contact between the first mobile object 1 that is a person moving in the facility and the second mobile object 2 moving in the facility. In this case, the image acquisition unit 170 may acquire predetermined image information for prompting the first mobile object 1 that is a person moving in the facility to pay attention to the presence of the approaching second mobile object 2.

With this configuration, in a case where it is predicted that there is a possibility of contact between the first mobile object 1 and the second mobile object 2, the display control device 100 can provide information for avoiding contact between the first mobile object 1 that is a person moving in the facility and the second mobile object 2 moving in the facility to the first mobile object 1 that is a person moving in the facility. In addition, in a case where it is predicted that there is no possibility of contact between the first mobile object 1 and the second mobile object 2, the display control device 100 can omit acquisition and output of image information indicating a display image or the like prompting the first mobile object 1 or the second mobile object 2 to stop.

In addition, in a case where the second mobile object 2 is an autonomous mobile device moving in the facility and the image acquisition unit 170 acquires image information indicating a display image suggesting, to the first mobile object 1 that is a person moving in the facility, that the second mobile object 2 will stop, the image acquisition unit 170 may cause the movement instruction unit 150 to output movement instruction information for instructing the autonomous mobile device that is the second mobile object 2 to temporarily stop. In addition, the image acquisition unit 170 may cause the movement instruction unit 150 to output movement instruction information for instructing the autonomous mobile device to move again after the first mobile object 1 that is a person moving in the facility passes the intersection between the first passage and the second passage.

Figure 5:
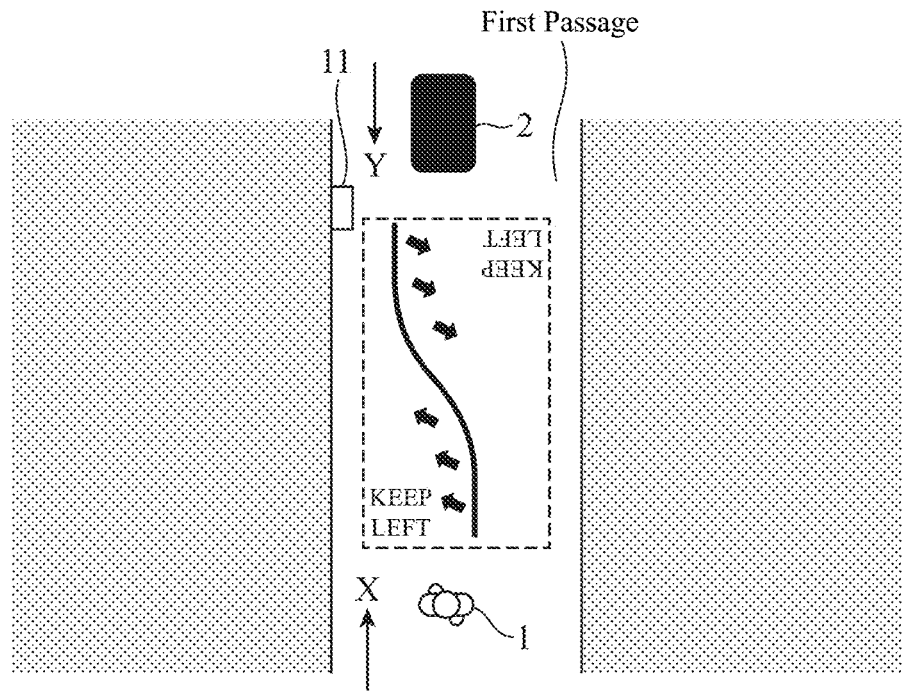
FIG. 5 is a diagram illustrating another example of image information acquired by the image output unit included in the display control device according to the first embodiment.

FIG. 5 is a diagram illustrating another example of the image information acquired by the image acquisition unit 170 according to the first embodiment on the basis of the first mobile object information and the second mobile object information.

More specifically, FIG. 5 is a diagram of a part of a floor in the facility as viewed from above and illustrates a state in which, in the above mode, the display image indicated by the image information acquired by the image acquisition unit 170 is displayed by the display output device 11.

FIG. 5 illustrates a first passage. FIG. 5 illustrates the first mobile object 1 and the second mobile object 2 moving on the first passage.

The first mobile object 1 illustrated in FIG. 5 moves on the first passage in a direction of an arrow X illustrated in FIG. 5.

In addition, the second mobile object 2 illustrated in FIG. 5 moves on the first passage in a direction of an arrow Y illustrated in FIG. 5.

The image acquisition unit 170 may acquire image information on the basis of a traffic rule that is a movement rule provided in advance in addition to the first mobile object information and the second mobile object information. The traffic rule places priority to, for example, left-hand traffic, right-hand traffic, or the like on the basis of a rule or common practice when a mobile object moves on a passage. The image acquisition unit 170 may have the information indicating the traffic rule in advance or may acquire the information from the storage device 14 via the network 19.

Specifically, for example, the image acquisition unit 170 acquires image information indicating a display image that prompts the first mobile object 1 and the second mobile object 2 to move while keeping to either the left or the right, on the basis of the first mobile object information, the second mobile object information, and the traffic rule provided in advance. FIG. 5 is a diagram illustrating a case where a display image prompting the first mobile object 1 and the second mobile object 2 to move while keeping to the left is displayed.

With this configuration, the display control device 100 can provide information for avoiding contact between the first mobile object 1 that is a person moving in the facility and the second mobile object 2 moving in the facility to the first mobile object 1 that is a person moving in the facility.

In addition, in a case where the second mobile object 2 is a person moving in the facility, the display control device 100 can provide, due to the above configuration, information for avoiding contact between the first mobile object 1 that is a person moving in the facility and the second mobile object 2 that is a person moving in the facility to the first mobile object 1 and the second mobile object 2 each of which is a person moving in the facility.

Furthermore, the display control device 100 may cause the display output device 11 to display a display image and may transmit control information for causing the second mobile object 2 that is an autonomous mobile device to perform movement corresponding to the display image.

A hardware configuration of a main part of the display control device 100 according to the first embodiment will be described with reference to FIGS. 6A and 6B.

Figure 6A:
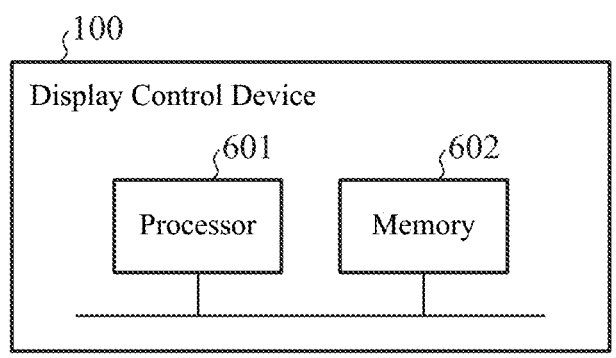
FIGS. 6A and 6B are diagrams each illustrating an example of a hardware configuration of the display control device according to the first embodiment.
Figure 6B:
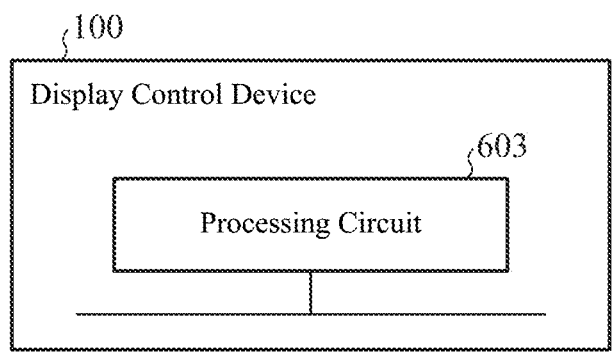

FIGS. 6A and 6B are diagrams each illustrating an example of a hardware configuration of the display control device 100 according to the first embodiment.

As illustrated in FIG. 6A, the display control device 100 is implemented by a computer, and the computer includes a processor 601 and a memory 602. The memory 602 stores a program for causing the computer to function as the first mobile object information acquiring unit 110, the second mobile object information acquiring unit 120, the contact prediction unit 130, the movement plan acquiring unit 140, the movement instruction unit 150, the facility layout acquiring unit 160, the image acquisition unit 170, and the image output unit 180. The processor 601 reads and executes the program stored in the memory 602, thereby implementing the functions of the first mobile object information acquiring unit 110, the second mobile object information acquiring unit 120, the contact prediction unit 130, the movement plan acquiring unit 140, the movement instruction unit 150, the facility layout acquiring unit 160, the image acquisition unit 170, and the image output unit 180.

In addition, as illustrated in FIG. 6B, the display control device 100 may include a processing circuit 603. In this case, the functions of the first mobile object information acquiring unit 110, the second mobile object information acquiring unit 120, the contact prediction unit 130, the movement plan acquiring unit 140, the movement instruction unit 150, the facility layout acquiring unit 160, the image acquisition unit 170, and the image output unit 180 may be implemented by the processing circuit 603.

Furthermore, the display control device 100 may include the processor 601, the memory 602, and the processing circuit 603 (this configuration is not illustrated). In this case, some of the functions of the first mobile object information acquiring unit 110, the second mobile object information acquiring unit 120, the contact prediction unit 130, the movement plan acquiring unit 140, the movement instruction unit 150, the facility layout acquiring unit 160, the image acquisition unit 170, and the image output unit 180 may be implemented by the processor 601 and the memory 602, and the remaining functions may be implemented by the processing circuit 603.

The processor 601 uses, for example, a central processing unit (CPU), a graphics processing unit (GPU), a microprocessor, a microcontroller, or a digital signal processor (DSP).

The memory 602 uses, for example, a semiconductor memory or a magnetic disk. More specifically, the memory 602 uses, for example, a random access memory (RAM), a read only memory (ROM), a flash memory, an erasable programmable read only memory (EPROM), an electrically erasable programmable read only memory (EEPROM), an SSD, or an HDD.

The processing circuit 603 uses, for example, an application specific integrated circuit (ASIC), a programmable logic device (PLD), a field-programmable gate array (FPGA), a system-on-a-chip (SoC), or a system large-scale integration (LSI).

The operation of the display control device 100 according to the first embodiment will be described with reference to FIG. 7.

FIG. 7 is a flowchart illustrating an example of processing performed by the display control device 100 according to the first embodiment. For example, the display control device 100 repeatedly executes the processing of the flowchart.

First, in step ST701, the facility layout acquiring unit 160 acquires facility layout information.

Next, in step ST702, the first mobile object information acquiring unit 110 acquires first mobile object information.

Next, in step ST703, the second mobile object information acquiring unit 120 acquires second mobile object information.

Next, when the second mobile object 2 is an autonomous mobile device that moves in the facility, the movement plan acquiring unit 140 acquires in step ST704 movement plan information indicating a movement plan of movement of the autonomous mobile device.

Next, in step ST705, the contact prediction unit 130 predicts whether or not there is a possibility of contact between the first mobile object 1 and the second mobile object 2, and outputs a prediction result.

Next, in step ST706, the image acquisition unit 170 acquires image information.

Next, in step ST707, the image output unit 180 outputs the image information.

Next, when the second mobile object 2 is an autonomous mobile device that moves in the facility, the movement instruction unit 150 outputs in step ST708 movement instruction information indicating a movement instruction for the autonomous mobile device.

After step ST708, the display control device 100 ends the processing of the flowchart. After completing the processing of the flowchart, the display control device 100 returns to step ST702 and repeatedly executes the processing of the flowchart.

Note that, in a case where the display control device 100 does not include the facility layout acquiring unit 160, the process of step ST701 is omitted.

In addition, in a case where the display control device 100 does not include the movement plan acquiring unit 140, the process of step ST704 is omitted.

In addition, in a case where the display control device 100 does not include the contact prediction unit 130, the process of step ST705 is omitted.

In addition, in a case where the display control device 100 does not include the movement instruction unit 150, the process of step ST708 is omitted.

In addition, the order of processes from step ST701 to step ST703 is freely determined.

As described above, the display control device 100 according to the first embodiment includes: the first mobile object information acquiring unit 110 that acquires the first mobile object information indicating the position, moving speed, and direction of movement of the first mobile object 1 moving in the facility; the second mobile object information acquiring unit 120 that acquires the second mobile object information indicating the position, moving speed, and direction of movement of the second mobile object 2 moving in the facility; the image acquisition unit 170 that acquires, on the basis of the first mobile object information acquired by the first mobile object information acquiring unit 110 and the second mobile object information acquired by the second mobile object information acquiring unit 120, image information indicating a display image to be displayed in a space in the facility by the display output device 11 installed in the facility; and the image output unit 180 that outputs the image information acquired by the image acquisition unit 170.

With this configuration, the display control device 100 can provide information for avoiding contact between the first mobile object 1 that is a person moving in the facility and the second mobile object 2 moving in the facility to the first mobile object 1 that is a person moving in the facility.

In addition, in a passage or the like in the facility where both a person and an autonomous mobile device move, there are many regions that become blind spots due to a structure such as a wall constituting the facility as compared with a road on which a vehicle travels. With this configuration, the display control device 100 can provide, to the first mobile object 1 that is a person moving in the facility, information for avoiding contact between the first mobile object 1 that is a person moving in the facility and the second mobile object 2 that moves in the blind spot for the first mobile object 1 in the facility.

In addition, although the conventional technique disclosed in Patent Literature 1 requires a pedestrian to carry a mobile terminal, the display control device 100 configured as described above eliminates the need for the first mobile object 1 that is a person moving in the facility to carry the mobile terminal. The display control device 100 can provide the first mobile object 1 with information for avoiding contact between the first mobile object 1 and the second mobile object 2 even if the first mobile object 1 does not carry the mobile terminal.

In addition, in the conventional technique disclosed in Patent Literature 1, it is necessary for the pedestrian to move his/her line of sight to the mobile terminal from the direction of his/her movement in order to view hazard information displayed on the mobile terminal, whereas the display control device 100 configured as described above displays the information for avoiding contact between the first mobile object 1 and the second mobile object 2 in a space visible to the first mobile object 1 in the facility, and thus can shorten the time required for the person that is the first mobile object 1 to take an appropriate action after confirming the information.

In addition, in the display control device 100 according to the first embodiment having the configuration described above, the image acquisition unit 170 acquires, when according to the first mobile object information and the second mobile object information, the type of the first mobile object 1 or the second mobile object 2 is a person, the image information indicating the display image to be displayed in a space visible to the first mobile object 1 or the second mobile object 2 whose type is a person.

With this configuration, the display control device 100 can provide the person moving in the facility with information for avoiding contact between the person moving in the facility and the mobile object moving in the facility.

In addition, the display control device 100 according to the first embodiment includes, in addition to the above configuration, the facility layout acquiring unit 160 to acquire the facility layout information indicating a position where a structure constituting the facility is located. The image acquisition unit 170 acquires the image information on the basis of the facility layout information acquired by the facility layout acquiring unit 160 in addition to the first mobile object information acquired by the first mobile object information acquiring unit 110 and the second mobile object information acquired by the second mobile object information acquiring unit 120.

With this configuration, the display control device 100 can provide information for avoiding contact between the first mobile object 1 that is a person moving in the facility and the second mobile object 2 moving in the facility to the first mobile object 1 that is a person moving in the facility depending on the layout of the structure constituting the facility.

Further, the display control device 100 according to the first embodiment includes, in addition to the above configuration, the movement plan acquiring unit 140 to acquire, when the first mobile object 1 or the second mobile object 2 is an autonomous mobile device that moves in the facility on the basis of a movement plan that has been set in advance, movement plan information indicating the movement plan of the first mobile object 1 or the second mobile object 2 that is the autonomous mobile device. The image acquisition unit 170 acquires the image information on the basis of the movement plan information acquired by the movement plan acquiring unit 140 in addition to the first mobile object information acquired by the first mobile object information acquiring unit 110 and the second mobile object information acquired by the second mobile object information acquiring unit 120.

With this configuration, the display control device 100 can provide information for avoiding contact between the person moving in the facility and the autonomous mobile device moving in the facility to the person moving in the facility depending on the movement plan of the autonomous mobile device moving in the facility.

The display control device 100 according to the first embodiment includes, in addition to the above configuration, the contact prediction unit 130 to predict contact between the first mobile object 1 and the second mobile object 2 on the basis of the first mobile object information acquired by the first mobile object information acquiring unit 110 and the second mobile object information acquired by the second mobile object information acquiring unit 120. The image acquisition unit 170 acquires the image information on the basis of a prediction result predicted by the contact prediction unit 130 in addition to the first mobile object information acquired by the first mobile object information acquiring unit 110 and the second mobile object information acquired by the second mobile object information acquiring unit 120.

With this configuration, in a case where there is a possibility of contact between a person moving in the facility and an autonomous mobile device moving in the facility, the display control device 100 can provide information for avoiding the contact to the person moving in the facility.

Furthermore, in the display control device 100 according to the first embodiment having the configuration described above, the image acquisition unit 170 acquires the image information on the basis of a movement rule provided in advance in addition to the first mobile object information acquired by the first mobile object information acquiring unit 110 and the second mobile object information acquired by the second mobile object information acquiring unit 120.

With this configuration, the display control device 100 can provide, to a person moving in the facility, information for avoiding contact between the person moving in the facility and a mobile object moving in the facility in consideration of the movement rule provided in advance.

Second Embodiment

A display control device 100a according to a second embodiment will be described with reference to FIGS. 8 to 12.

A configuration of a main part of a display system 10a according to the second embodiment to which the display control device 100a according to the second embodiment is applied will be described with reference to FIG. 8.

Figure 8:
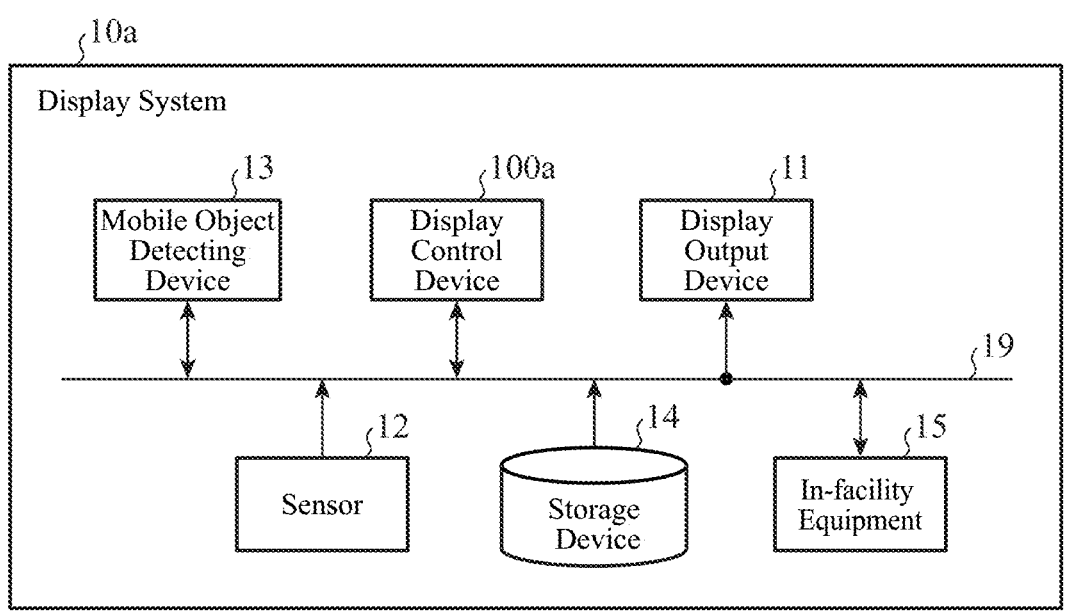
FIG. 8 is a block diagram illustrating an example of a configuration of a main part of a display system according to a second embodiment to which a display control device according to the second embodiment is applied.

FIG. 8 is a block diagram illustrating an example of the configuration of the main part of the display system 10a according to the second embodiment to which the display control device 100a according to the second embodiment is applied.

The display system 10a is obtained by adding in-facility equipment 15 to the display system 10 according to the first embodiment, and changing the display control device 100 in the display system 10 according to the first embodiment to the display control device 100a.

That is, the display system 10a includes the display output device 11, the sensor 12, the mobile object detecting device 13, the storage device 14, the in-facility equipment 15, and the display control device 100a.

The display output device 11, the sensor 12, the mobile object detecting device 13, the storage device 14, the in-facility equipment 15, and the display control device 100a included in the display system 10a are connected to each other via a network 19 capable of transmitting and receiving information.

In FIG. 8, the same reference signs are given to the same blocks as those illustrated in FIG. 1, and the description thereof will be omitted.

The in-facility equipment 15 includes equipment installed in the facility such as an elevator, an automatic door, a security gate, or a platform door which is equipment of a station facility, and indicates equipment through which a person moving in the facility or an autonomous mobile device such as a self-propelled robot moving in the facility goes in or out or passes.

The sensor 12 is provided in the in-facility equipment 15. The sensor 12 outputs sensor information to the in-facility equipment 15. The in-facility equipment 15 acquires the sensor information output by the sensor 12 and outputs the sensor information to the mobile object detecting device 13.

The in-facility equipment 15 outputs equipment state information indicating an operating state of equipment installed in the facility to the display control device 100a. For example, in a case where the in-facility equipment 15 is an elevator, the equipment state information is information indicating the position of a car in the hoistway, information indicating the operation state of a landing operation panel, information indicating the operation state of a car operation panel, or the like. In addition, the equipment state information is, for example, information indicating an open/closed state of a door or a gate in a case where the in-facility equipment 15 is equipment such as an automatic door, a security gate, or a platform door.

The display control device 100a acquires the first mobile object information and the second mobile object information output from the mobile object detecting device 13 and the equipment state information output from the in-facility equipment 15, and outputs image information indicating a display image corresponding to the first mobile object information and the second mobile object information to the in-facility equipment 15.

The in-facility equipment 15 acquires the image information output from the display control device 100a, and outputs the acquired image information to the display output device 11.

More specifically, for example, the in-facility equipment 15 outputs the image information acquired from the display control device 100a as an image signal for causing the display output device 11 to output the image information as a display image.

The configuration of the main part of the display control device 100a according to the second embodiment will be described with reference to FIG. 9.

Figure 9:
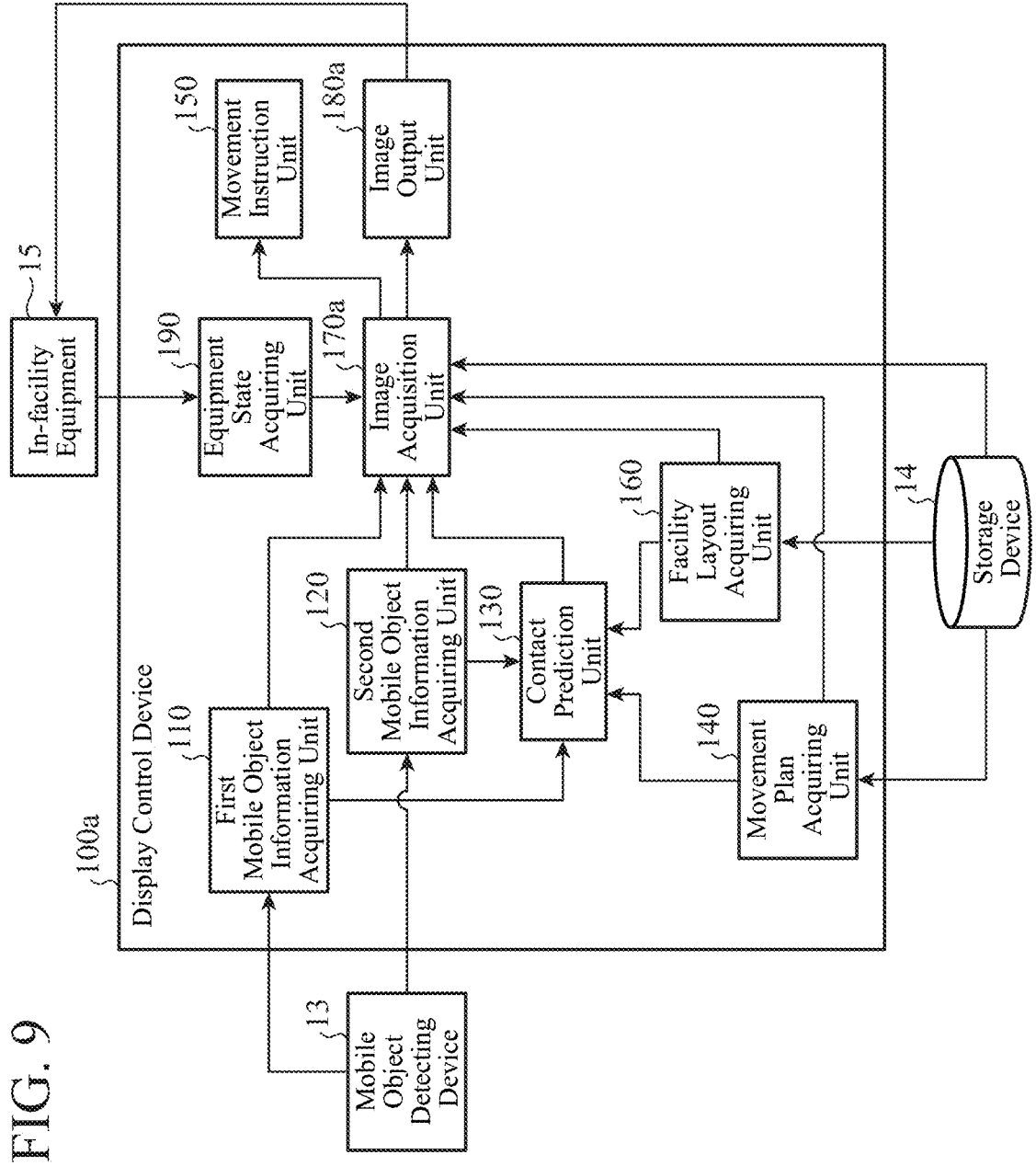
FIG. 9 is a block diagram illustrating an example of a configuration of a main part of the display control device according to the second embodiment.

FIG. 9 is a block diagram illustrating an example of the configuration of the main part of the display control device 100a according to the second embodiment.

The display control device 100a is obtained by adding an equipment state acquiring unit 190 to the display control device 100 according to the first embodiment, and changing the image acquisition unit 170 and the image output unit 180 in the display control device 100 according to the first embodiment to an image acquisition unit 170a and an image output unit 180a.

That is, the display control device 100a includes the first mobile object information acquiring unit 110, the second mobile object information acquiring unit 120, the contact prediction unit 130, the movement plan acquiring unit 140, the movement instruction unit 150, the facility layout acquiring unit 160, the equipment state acquiring unit 190, the image acquisition unit 170a, and the image output unit 180a.

In FIG. 9, the same reference signs are given to the same blocks as those illustrated in FIG. 3, and the description thereof will be omitted.

The equipment state acquiring unit 190 acquires equipment state information output by the in-facility equipment 15.

The image acquisition unit 170a acquires image information on the basis of the equipment state information acquired by the equipment state acquiring unit 190 in addition to the first mobile object information acquired by the first mobile object information acquiring unit 110 and the second mobile object information acquired by the second mobile object information acquiring unit 120.

Similarly to the image information acquired by the image acquisition unit 170 according to the first embodiment, the image information acquired by the image acquisition unit 170a is image information indicating a display image to be displayed in a space in the facility by the display output device 11 installed in the facility.

The image output unit 180a outputs the image information acquired by the image acquisition unit 170a. More specifically, the image output unit 180a outputs the image information to the in-facility equipment 15.

Note that the display control device 100a may generate control information for causing a mobile object that is an autonomous mobile device to perform movement corresponding to the display image indicated by image information output by the image output unit 180a, and transmit the control information to the mobile object.

Note that the functions of the first mobile object information acquiring unit 110, the second mobile object information acquiring unit 120, the contact prediction unit 130, the movement plan acquiring unit 140, the movement instruction unit 150, the facility layout acquiring unit 160, the equipment state acquiring unit 190, the image acquisition unit 170a, and the image output unit 180a included in the display control device 100a according to the second embodiment may be implemented by the processor 601 and the memory 602 or by the processing circuit 603 in the hardware configuration illustrated as an example in FIGS. 6A and 6B in the first embodiment.

The image information acquired by the image acquisition unit 170a according to the second embodiment on the basis of the first mobile object information, the second mobile object information, and the equipment state information will be described with reference to FIGS. 10 and 11.

FIGS. 10A, 10B, 10C, and 10D are diagrams illustrating examples of image information acquired by the image acquisition unit 170a according to the second embodiment on the basis of the first mobile object information, the second mobile object information, and the equipment state information in a case where the in-facility equipment 15 is an elevator.

More specifically, FIGS. 10A, 10B, 10C, and 10D are diagrams when a landing door of the elevator is viewed from a certain floor in the facility and illustrate a state in which a display image indicated by the image information acquired by the image acquisition unit 170a is displayed by the display output device 11 in a case where the in-facility equipment 15 is an elevator.

FIGS. 10A, 10B, 10C, and 10D illustrate states in which the display images indicated by the image information acquired by the image acquisition unit 170a are chronologically displayed by the display output device 11 in the order of FIGS. 10A, 10B, 10C, and 10D.

Figure 10A:
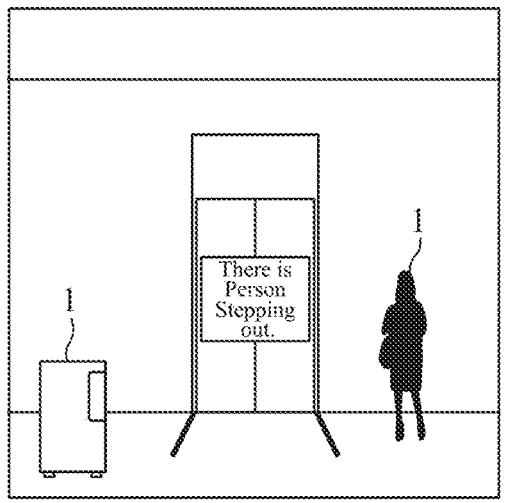
FIGS. 10A, 10B, 10C, and 10D are diagrams illustrating examples of image information acquired by an image output unit included in the display control device according to the second embodiment, in a case where in-facility equipment is an elevator.

FIG. 10A illustrates a state in which two mobile objects moving in the facility are waiting for an elevator car to arrive on a certain floor in the facility. In addition, FIG. 10A illustrates a state in which a mobile object (not illustrated) moving in the facility is in the car. In the description of FIG.

10A, two mobile objects waiting for arrival of the car on the floor are regarded as one mobile object and referred to as a first mobile object 1, and one or more mobile objects that are in the car are referred to as a second mobile object 2 (not illustrated).

In the following description, at least one of two mobile objects as the first mobile object 1 is a person moving in the facility, for example.

The in-facility equipment 15 which is an elevator outputs, to the display control device 100*a*, information indicating an operation state of a landing operation panel on the floor, information indicating an operation state of a car operation panel in the car, information indicating that the car is moving to the floor, and the like as equipment state information. For example, in FIG. 10A, the information indicating the operation state of the landing operation panel on the floor indicates information representing the operation state for stopping the car on the floor, and the information indicating the operation state of the car operation panel in the car indicates information representing the operation state for stopping the car on the floor.

The sensor 12 (not illustrated) installed in the car outputs sensor information to the mobile object detecting device 13. The mobile object detecting device 13 acquires the sensor information output from the sensor 12, thereby generates second mobile object information indicating the position and the like of the second mobile object 2, and outputs the generated second mobile object information to the display control device 100*a*.

The sensor 12 (not illustrated) installed on the floor outputs sensor information to the mobile object detecting device 13. The mobile object detecting device 13 acquires the sensor information output from the sensor 12, thereby generates first mobile object information indicating the position and the like of the first mobile object 1, and outputs the generated first mobile object information to the display control device 100*a*.

The image acquisition unit 170*a* acquires image information indicating, for example, a display image suggesting to the first mobile object 1 that the second mobile object 2 may step from the car and prompting the first mobile object 1 to stop, on the basis of the first mobile object information acquired by the first mobile object information acquiring unit 110, the second mobile object information acquired by the second mobile object information acquiring unit 120, and the equipment state information acquired by the equipment state acquiring unit 190.

FIG. 10A illustrates a state in which the display output device 11 (not illustrated) installed on the floor side of the elevator displays the display image indicated by the image information.

With this configuration, the display control device 100*a* can provide a person moving in the facility with information for avoiding contact between the person moving in the facility and a mobile object moving in the facility.

Figure 10B:
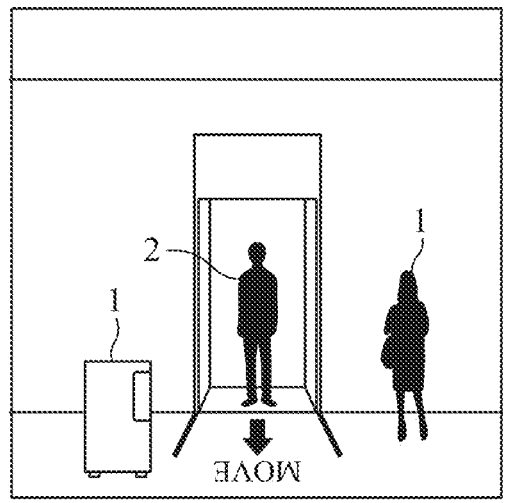

FIG. 10B illustrates a state in which the car arrives at the floor and the landing door is opened after the state illustrated in FIG. 10A. In the description of FIG. 10B, two mobile objects waiting for arrival of the car on the floor are regarded as one mobile object and referred to as a first mobile object 1, and one or more mobile objects that are in the car are referred to as a second mobile object 2.

The in-facility equipment 15 which is an elevator outputs, to the display control device 100*a*, information indicating that the car stops on the floor and the landing door on the floor opens, etc. as equipment state information.

The sensor 12 (not illustrated) installed in the car outputs sensor information to the mobile object detecting device 13. The mobile object detecting device 13 acquires the sensor information output from the sensor 12, thereby generates second mobile object information indicating the position and the like of the second mobile object 2, and outputs the generated second mobile object information to the display control device 100*a*.

The sensor 12 (not illustrated) installed on the floor outputs sensor information to the mobile object detecting device 13. The mobile object detecting device 13 acquires the sensor information output from the sensor 12, thereby generates first mobile object information indicating the position and the like of the first mobile object 1, and outputs the generated first mobile object information to the display control device 100*a*.

The image acquisition unit 170*a* acquires image information indicating, for example, a display image prompting the second mobile object 2 to step from the car and prompting the first mobile object 1 to stop, on the basis of the first mobile object information acquired by the first mobile object information acquiring unit 110, the second mobile object information acquired by the second mobile object information acquiring unit 120, and the equipment state information acquired by the equipment state acquiring unit 190.

FIG. 10B illustrates a state in which the display output device 11 (not illustrated) installed on the floor side of the elevator displays the display image indicated by the image information.

With this configuration, the display control device 100*a* can provide a person moving in the facility with information for avoiding contact between the person moving in the facility and a mobile object moving in the facility.

Figure 10C:
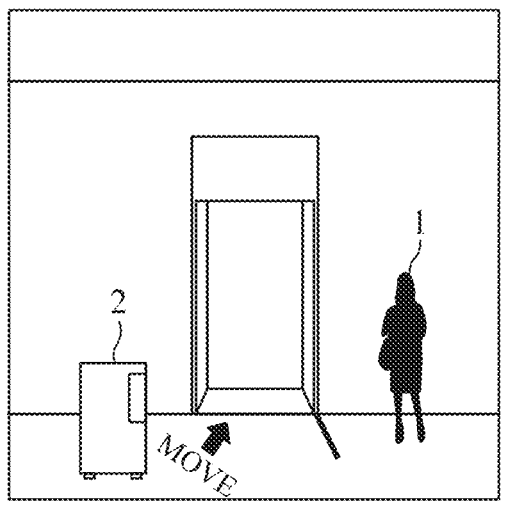

FIG. 10C illustrates a state, after the state illustrated in FIG. 10B, in which one or more mobile objects in the car have stepped from the car of the elevator and two mobile objects that move in the facility have not yet entered the car. In the description of FIG. 10C, one of the two mobile objects moving in the facility and about to enter the car is referred to as a first mobile object 1, and the other is referred to as a second mobile object 2.

In the following, as an example, the first mobile object 1 is a person moving in the facility, and the second mobile object 2 is an autonomous mobile device such as a self-propelled robot that moves in the facility or a person moving in the facility.

The in-facility equipment 15 which is an elevator outputs, to the display control device 100*a*, information indicating that the car stops on the floor and the landing door on the floor opens, etc. as equipment state information.

The sensor 12 (not illustrated) installed on the floor outputs sensor information to the mobile object detecting device 13. The mobile object detecting device 13 acquires the sensor information output from the sensor 12, thereby generates first mobile object information indicating the position and the like of the first mobile object 1 and second mobile object information indicating the position and the like of the second mobile object 2, and outputs the generated first mobile object information and second mobile object information to the display control device 100*a*.

The image acquisition unit 170*a* acquires image information indicating, for example, a display image prompting the second mobile object 2 to step into the car and prompting the first mobile object 1 to stop, on the basis of the first mobile object information acquired by the first mobile object information acquiring unit 110, the second mobile object information acquired by the second mobile object information acquiring unit 120, and the equipment state information acquired by the equipment state acquiring unit 190.

FIG. 10C illustrates a state in which the display output device 11 (not illustrated) installed on the floor side of the elevator displays the display image indicated by the image information.

With this configuration, the display control device 100a can provide a person moving in the facility with information for avoiding contact between the person moving in the facility and a mobile object moving in the facility.

Figure 10D:
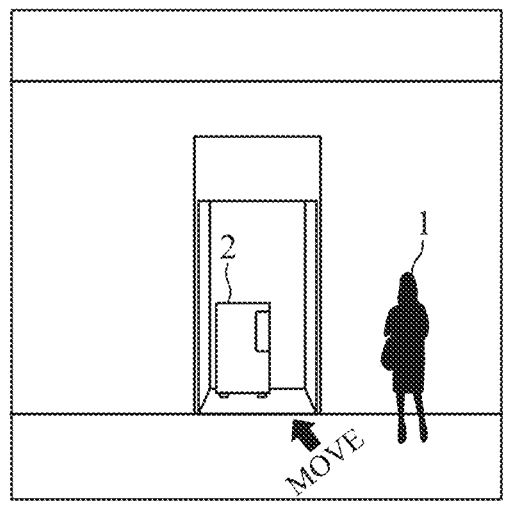

FIG. 10D illustrates a state, after the state illustrated in FIG. 10C, in which the second mobile object 2 has entered the car and the first mobile object 1 has not yet entered the car.

The in-facility equipment 15 which is an elevator outputs, to the display control device 100a, information indicating that the car stops on the floor and the landing door on the floor opens, etc. as equipment state information.

The sensor 12 (not illustrated) installed in the car outputs sensor information to the mobile object detecting device 13. The mobile object detecting device 13 acquires the sensor information output from the sensor 12, thereby generates first mobile object information indicating the position and the like of the first mobile object 1, and outputs the generated first mobile object information to the display control device 100a.

The sensor 12 (not illustrated) installed on the floor outputs sensor information to the mobile object detecting device 13. The mobile object detecting device 13 acquires the sensor information output from the sensor 12, thereby generates second mobile object information indicating the position and the like of the second mobile object 2, and outputs the generated second mobile object information to the display control device 100a.

The image acquisition unit 170a acquires image information indicating, for example, a display image prompting the first mobile object 1 to step into the car on the basis of the first mobile object information acquired by the first mobile object information acquiring unit 110, the second mobile object information acquired by the second mobile object information acquiring unit 120, and the equipment state information acquired by the equipment state acquiring unit 190.

FIG. 10D illustrates a state in which the display output device 11 (not illustrated) installed on the floor side of the elevator displays the display image indicated by the image information.

With this configuration, the display control device 100a can provide a person moving in the facility with information for avoiding contact between the person moving in the facility and a mobile object moving in the facility.

Figure 11:
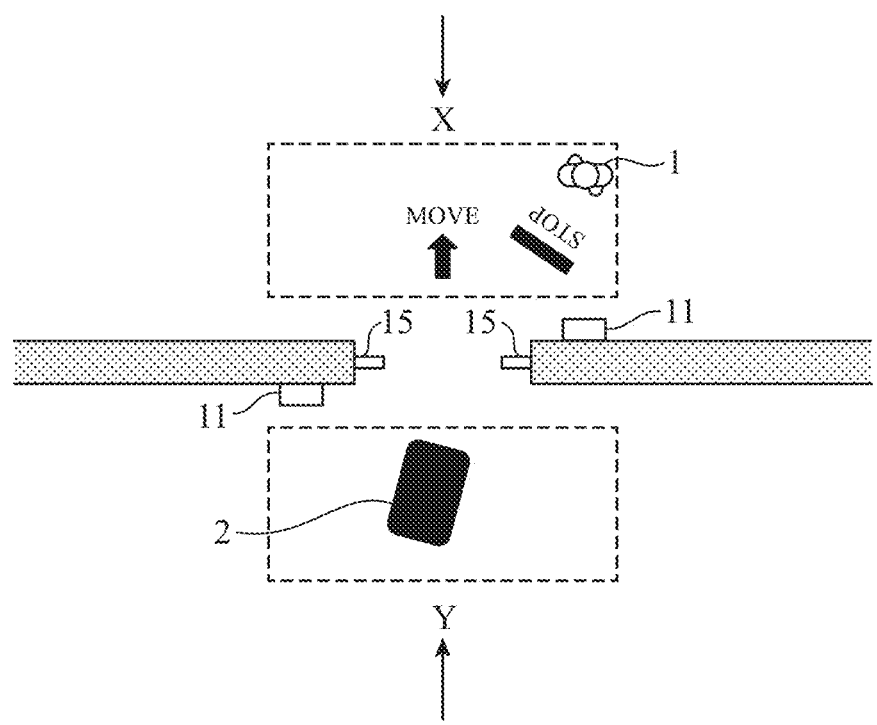
FIG. 11 is a diagram illustrating an example of image information acquired by the image output unit included in the display control device according to the second embodiment, in a case where the in-facility equipment is an automatic door.

FIG. 11 is a diagram illustrating an example of image information acquired by the image acquisition unit 170a according to the second embodiment on the basis of the first mobile object information, the second mobile object information, and the equipment state information in a case where the in-facility equipment 15 is an automatic door.

More specifically, FIG. 11 is a diagram when the floor surface of a certain floor in the facility is viewed from the ceiling and illustrates a state in which the display image indicated by the image information acquired by the image acquisition unit 170a is displayed by the display output device 11 in a case where the in-facility equipment 15 is an automatic door.

FIG. 11 illustrates a state in which the first mobile object 1 that moves in the facility and that is about to pass through the automatic door in a direction of an arrow X in FIG. 11 has not yet passed through the automatic door. In addition, FIG. 11 illustrates a state in which the second mobile object 2 that moves in the facility and that is about to pass through the automatic door in a direction of an arrow Y in FIG. 11 has not yet passed through the automatic door.

In the following, as an example, the first mobile object 1 is a person moving in the facility, and the second mobile object 2 is an autonomous mobile device such as a self-propelled robot that moves in the facility or a person moving in the facility.

The in-facility equipment 15 which is an automatic door outputs information indicating an open/closed state of the automatic door and the like to the display control device 100a as equipment state information.

The sensor 12 (not illustrated) installed in the automatic door or a structure constituting the facility such as a wall or a ceiling in the vicinity of the automatic door outputs sensor information to the mobile object detecting device 13. The mobile object detecting device 13 acquires the sensor information output from the sensor 12, thereby generates first mobile object information indicating the position and the like of the first mobile object 1 and second mobile object information indicating the position and the like of the second mobile object 2, and outputs the generated first mobile object information and second mobile object information to the display control device 100a.

The image acquisition unit 170a acquires image information indicating, for example, a display image prompting the first mobile object 1 to stop and suggesting to the first mobile object 1 that the second mobile object 2 will move, on the basis of the first mobile object information acquired by the first mobile object information acquiring unit 110, the second mobile object information acquired by the second mobile object information acquiring unit 120, and the equipment state information acquired by the equipment state acquiring unit 190. The image information acquired by the image acquisition unit 170a may indicate a display image or the like prompting the first mobile object 1 to stop and prompting the second mobile object 2 to move, or may indicate a display image or the like suggesting to the second mobile object 2 that the first mobile object 1 will stop and prompting the second mobile object 2 to move.

FIG. 11 illustrates a state in which the display output device 11 installed on the wall near the automatic door displays a display image prompting the first mobile object 1 which is a person moving in the facility to stop and suggesting to the first mobile object 1 that the second mobile object 2 which is an autonomous mobile device moving in the facility will move.

With this configuration, the display control device 100a can provide a person moving in the facility with information for avoiding contact between the person moving in the facility and a mobile object moving in the facility.

Although the image information acquired by the image acquisition unit 170a has been described with reference to FIG. 11 using an example in which the in-facility equipment 15 is an automatic door, the components can also be similarly configured in a case where the in-facility equipment 15 is a security gate, a platform door which is equipment of a station facility, or the like.

Note that the image acquisition unit 170a may acquire the image information on the basis of the prediction result predicted by the contact prediction unit 130, the movement plan information acquired by the movement plan acquiring unit 140, the facility layout information acquired by the facility layout acquiring unit 160, or a movement rule provided in advance, in addition to the first mobile object information acquired by the first mobile object information acquiring unit 110, the second mobile object information acquired by the second mobile object information acquiring unit 120, and the equipment state information acquired by the equipment state acquiring unit 190.

A mode in which the image acquisition unit 170a acquires image information on the basis of a prediction result predicted by the contact prediction unit 130, movement plan information acquired by the movement plan acquiring unit 140, facility layout information acquired by the facility layout acquiring unit 160, or a movement rule provided in advance has been described in the first embodiment, and thus the description thereof will be omitted.

The operation of the display control device 100a according to the second embodiment will be described with reference to FIG. 12.

FIG. 12 is a flowchart illustrating an example of processing performed by the display control device 100a according to the second embodiment. The display control device 100a repeatedly executes the processing of the flowchart, for example.

First, in step ST1201, the facility layout acquiring unit 160 acquires facility layout information.

Next, in step ST1202, the first mobile object information acquiring unit 110 acquires first mobile object information.

Next, in step ST1203, the second mobile object information acquiring unit 120 acquires second mobile object information.

Next, in step ST1204, the equipment state acquiring unit 190 acquires equipment state information.

Next, when the second mobile object 2 is an autonomous mobile device that moves in the facility, the movement plan acquiring unit 140 acquires in step ST1205 movement plan information indicating a movement plan of movement of the autonomous mobile device.

Next, in step ST1206, the contact prediction unit 130 predicts whether or not there is a possibility of contact between the first mobile object 1 and the second mobile object 2, and outputs the prediction result.

Next, in step ST1207, the image acquisition unit 170a acquires image information.

Next, in step ST1208, the image output unit 180a outputs the image information.

Next, when the second mobile object 2 is an autonomous mobile device that moves in the facility, the movement instruction unit 150 outputs in step ST1209 movement instruction information indicating a movement instruction for the autonomous mobile device.

After step ST1209, the display control device 100a ends the processing of the flowchart. After completing the processing of the flowchart, the display control device 100a returns to step ST1202 and repeatedly executes the processing of the flowchart.

Note that, in a case where the display control device 100a does not include the facility layout acquiring unit 160, the process of step ST1201 is omitted.

In addition, in a case where the display control device 100a does not include the movement plan acquiring unit 140, the process of step ST1205 is omitted.

In addition, in a case where the display control device 100a does not include the contact prediction unit 130, the process of step ST1206 is omitted.

In addition, in a case where the display control device 100a does not include the movement instruction unit 150, the process of step ST1209 is omitted.

In addition, the order of processes from step ST1201 to step ST1204 is freely determined.

As described above, the display control device 100a according to the second embodiment includes: the first mobile object information acquiring unit 110 that acquires the first mobile object information indicating the position, moving speed, and direction of movement of the first mobile object 1 moving in the facility; the second mobile object information acquiring unit 120 that acquires the second mobile object information indicating the position, moving speed, and direction of movement of the second mobile object 2 moving in the facility; the equipment state acquiring unit 190 that acquires equipment state information indicating the operating state of equipment installed in the facility; the image acquisition unit 170a that acquires, on the basis of the equipment state information acquired by the equipment state acquiring unit 190 in addition to the first mobile object information acquired by the first mobile object information acquiring unit 110 and the second mobile object information acquired by the second mobile object information acquiring unit 120, image information indicating a display image to be displayed in a space in the facility by the display output device 11 installed in the facility; and the image output unit 180a that outputs the image information acquired by the image acquisition unit 170a.

With this configuration, the display control device 100a can provide a person moving in the facility with information for avoiding contact between the person moving in the facility and a mobile object moving in the facility in response to the operating state of the equipment.

Note that the display control devices 100 and 100a and the display systems 10 and 10a are also applicable to a facility where a vehicle including an automobile travels, such as a parking lot. When the facility is a facility such as a parking lot, the autonomous mobile device may be a vehicle. In addition, in a case where the facility is a facility such as a parking lot, the equipment installed in the facility is a gate provided at an entrance of a parking lot or the like, a vehicle lock device such as a lock plate that restricts movement of a parked vehicle, or the like.

It is to be noted that the above embodiments can be freely combined, or any component in the embodiments can be modified or omitted, within the scope of the present invention.

INDUSTRIAL APPLICABILITY

The display control device of the present invention can be applied to a display system that displays a display image in a facility.

REFERENCE SIGNS LIST

1: first mobile object, 2: second mobile object, 10, 10a: display system, 11, 11-1, 11-2, 11-3, 11-4: display output device, 12: sensor, 13: mobile object detecting device, 14: storage device, 15: in-facility equipment, 19: network, 100, 100a: display control device, 110: first mobile object information acquiring unit, 120: second mobile object information acquiring unit, 130: contact prediction unit, 140: movement plan acquiring unit, 150: movement instruction unit, 160: facility layout acquiring unit, 170, 170a: image acquisition unit, 180, 180a: image output unit, 190: equipment state acquiring unit, 601: processor, 602: memory, 603: processing circuit

The invention claimed is:
1. A display control device comprising:
processing circuitry to acquire first mobile object information indicating a position, a moving speed, and a direction of movement of a first mobile object moving in a facility;

to acquire second mobile object information indicating a position, a moving speed, and a direction of movement of a second mobile object moving in the facility;

to acquire, on a basis of the first mobile object information acquired and the second mobile object information acquired, image information indicating a display image to be displayed in a space in the facility by a display installed in the facility, the space being visible to the first mobile object and/or the second mobile object; and to output the image information acquired, wherein one of the first mobile object or the second mobile object is an autonomous mobile device that moves in the facility on a basis of a movement plan that has been set in advance, and the other of the first mobile object or the second mobile object is a person, the processing circuitry acquires, when the first mobile object or the second mobile object is the autonomous mobile device, movement plan information indicating the movement plan of the autonomous mobile device via a network, and the processing circuitry acquires the image information on a basis of the movement plan information acquired in addition to the first mobile object information acquired and the second mobile object information acquired.

2. The display control device according to claim 1, wherein the processing circuitry acquires, when according to the first mobile object information and the second mobile object information, a type of the second mobile object is the person, the image information indicating the display image to be displayed in the space visible to the first mobile object or the second mobile object whose type is the person.

3. The display control device according to claim 1, wherein the processing circuitry acquires equipment state information indicating an operating state of equipment installed in the facility, and the processing circuitry acquires the image information on a basis of the equipment state information acquired in addition to the first mobile object information acquired and the second mobile object information acquired.

4. The display control device according to claim 1, wherein the processing circuitry acquires facility layout information indicating a position where a structure constituting the facility is located, and the processing circuitry acquires the image information on a basis of the facility layout information acquired in addition to the first mobile object information acquired and the second mobile object information acquired.

5. The display control device according to claim 1, wherein the processing circuitry predicts contact between the first mobile object and the second mobile object on a basis of the first mobile object information acquired and the second mobile object information acquired, and the processing circuitry acquires the image information on a basis of a result of the prediction in addition to the first mobile object information acquired and the second mobile object information acquired.

6. The display control device according to claim 1, wherein the processing circuitry acquires the image information on a basis of a movement rule provided in advance in addition to the first mobile object information acquired and the second mobile object information acquired.

7. The display control device according to claim 1, wherein the processing circuitry outputs, when the first mobile object is the autonomous mobile device in the form of an autonomous mobile robot that moves in the facility on the basis of the movement plan that has been set in advance, movement instruction information indicating a movement instruction for the first mobile object that is the autonomous mobile robot, and the movement instruction information corresponds to the display image that is indicated by the image information acquired.

8. A display system comprising:

a display to display a display image indicated by acquired image information in a space in a facility, the display being installed in the facility, the space being visible to a first mobile object moving in the facility and/or a second mobile object moving in the facility; and a display controller to acquire the image information on a basis of first mobile object information and second mobile object information, and output the acquired image information to the display, the first mobile object information indicating a position, a moving speed, and a direction of movement of the first mobile object and being generated on a basis of sensor information output by a sensor installed in the facility, the second mobile object information indicating a position, a moving speed, and a direction of movement of the second mobile object and being generated on the basis of the sensor information output by the sensor installed in the facility, wherein one of the first mobile object or the second mobile object is an autonomous mobile device that moves in the facility on a basis of a movement plan that has been set in advance, and the other of the first mobile object or the second mobile object is a person, the display controller includes processing circuitry configured to acquire, when the first mobile object or the second mobile object is the autonomous mobile device, movement plan information indicating the movement plan of the autonomous mobile device via a network, and acquire the image information on the basis of the movement plan information acquired in addition to the first mobile object information acquired and the second mobile object information acquired.

9. A display control method comprising:

acquiring first mobile object information indicating a position, a moving speed, and a direction of movement of a first mobile object moving in a facility;

acquiring second mobile object information indicating a position, a moving speed, and a direction of movement of a second mobile object moving in the facility;

acquiring, on a basis of the first mobile object information acquired and the second mobile object information acquired, image information indicating a display image to be displayed in a space in the facility by a display installed in the facility, the space being visible to the first mobile object and/or the second mobile object; and outputting the image information acquired,
wherein one of the first mobile object or the second mobile object is an autonomous mobile device that moves in the facility on a basis of a movement plan that has been set in advance, and the other of the first mobile object or the second mobile object is a person,
the display control method further comprises:
acquiring, when the first mobile object or the second mobile object is the autonomous mobile device, movement plan information indicating the movement plan of the autonomous mobile device via a network; and
acquiring the image information on the basis of the movement plan information acquired in addition to the first mobile object information acquired and the second mobile object information acquired.

* * * * *